(12) United States Patent
Gross et al.

(10) Patent No.: US 6,486,295 B1
(45) Date of Patent: Nov. 26, 2002

(54) LIPASE-CATALYZED TRANSESTERIFICATIONS TO REGULATE COPOLYMER STRUCTURE

(76) Inventors: Richard A. Gross, 16 Northern Pkwy. East, Plainview, NY (US) 11803; Ajay Kumar, 427 Senator St., Apt. #7, Brooklyn, NY (US) 11220

( * ) Notice: Subject to any disclaimer, the term of this patent is extended or adjusted under 35 U.S.C. 154(b) by 0 days.

(21) Appl. No.: 09/489,772

(22) Filed: Jan. 24, 2000

(51) Int. Cl.$^7$ .......................... C08G 63/08; C08L 93/00
(52) U.S. Cl. ..................... 528/354; 528/274; 528/302; 528/308; 524/764; 525/437; 525/444
(58) Field of Search .................. 528/274, 302, 528/308, 354; 524/764; 525/437, 444

(56) References Cited

U.S. PATENT DOCUMENTS

| | | | |
|---|---|---|---|
| 4,892,822 A | * | 1/1990 | Abramowicz et al. ...... 435/132 |
| 5,147,791 A | * | 9/1992 | Morrow et al. ............. 435/123 |
| 5,747,434 A | * | 5/1998 | Lamsa et al. ............... 508/485 |
| 5,962,624 A | * | 10/1999 | Von Derhagen et al. .... 528/274 |

* cited by examiner

*Primary Examiner*—Samuel A. Acquah
(74) *Attorney, Agent, or Firm*—Technoprop Colton LLC

(57) ABSTRACT

A method to regulate copolymer structure using lipase catalyzed transesterification reactions, by selecting a first reactant from the group consisting of polymers and monomers, selecting a second reactant from the group consisting of polymers and monomers, and combining the first reactant, the second reactant, and a lipase in a reaction vessel and allowing the ensuing transesterification reaction to proceed resulting in a polymer. The method allows one to regulate the copolymer repeat unit sequence distribution, and may take place with chain-length specificity such that activation of chains for exchange reactions with other chains or monomers can occur preferentially at certain locations along the chain.

48 Claims, 16 Drawing Sheets

LIPASE-CATALYZED TRANSESTERIFICATIONS TO REGULATE COPOLYMER STRUCTURE

BACKGROUND OF THE INVENTION

1. Technical Field

The present invention relates generally to the field of transesterification reactions for regulating copolymer physico-mechanical and biological properties and more specifically to the use of lipase-catalyzed selective transesterification reactions to construct novel polymers.

2. Prior Art

Chemical methods that result in the copolymerization of two or more monomers are a key strategy for the 'tailoring' of polymeric materials. Unfortunately, in many cases, important copolymer compositions and repeat unit sequences that may offer key property benefits are not attainable by using existing methods. Also, chemical methods to catalyze polymer-polymer transesterification reactions have met with limited success due to the need for high-temperature reactions that lead to undesirable chain decomposition including molecular weight decrease. However, such transesterification reactions are extremely valuable for regulating copolymer physico-mechanical and biological properties.

Transesterification reactions between preformed polymers, a monomer-polymer pair, or two monomers, are of importance in industry to rapidly 'tune' physico-mechanical and biological properties. In addition, many commercially important blends contain polyesters as one or more components that may undergo transesterification reactions during melt processing. In the pursuit of efficient transesterification reactions, it often is necessary to use high temperatures and catalysts that leave toxic residues in products. Furthermore, these chemical routes do not provide selectivity over the site at which chains are cleaved during exchange reactions. Moreover, these reactions often lead to non-desired side reactions that decrease product molecular weight and/or produce colored substances.

Therefore, it is evident that there is a need for transesterification reactions that can proceed at lower temperatures, with catalysts that do not leave toxic residues, do not lead to non-desired side reactions, and provide selectivity over the site at which chains are cleaved during exchange reactions. It is to this need that the present invention is directed.

BRIEF SUMMARY OF THE INVENTION

The use of lipases in monophasic organic media has proved useful to facilitate mild selective transesterification reactions of low molecular weight substances. In the present invention, lipase-catalyzed selective transesterification reactions are used to construct novel polymers. An important advantage of the present invention is the ability to regulate the copolymer repeat unit sequence distribution. In addition, the lipase-catalyzed transesterification reactions of the present invention take place with chain-length specificity. In other words, activation of chains for exchange reactions with other chains or monomers can occur preferentially at certain locations along the chain.

The new methods disclosed herein have led to important new polymer compositions where repeat units are linked by ester, carbonate, amide, ether or various combinations of these bonds. Examples of uses for the polymers prepared by the present invention are plastics, adhesives, coatings, biodegradable plastics, bioresorbable implant materials, to aid wound healing of burn patients, as scaffolds for cell growth and in drug release formulations. Methods are disclosed by which lipases catalyze the formation of copolymers by reactions between two or more preformed polyesters, polyester and a monomer (such as lactone or cyclic carbonate), a polycarbonate and a monomer, and reactions between two or more monomers.

The novel method to regulate copolymer structure using lipase catalyzed transesterification reactions disclosed herein comprises the general steps of selecting a first reactant from the group consisting of polymers and monomers, selecting a second reactant from the group consisting of polymers and monomers, and combining the first reactant, the second reactant, and a lipase in a reaction vessel and allowing the ensuing transesterification reaction to proceed resulting in a desired polymer. Preferably a solvent also is present in the reaction vessel. The lipase preferably is an immobilized lipase maintained at approximately 70° C., and the reaction is allowed to proceed for between 1 min and 24 hr depending on the product desired.

The present invention discloses the lipase-catalyzed synthesis of copolymers having mixed linkages such as ester/ether, ester/carbonate and ether/carbonate. Lipase-catalyzed transesterification reactions may be used to form copolymers that are random, diblock, multiblock or some other arrangement of repeat units along a copolymer chain. For example, lipases may be used to catalyze transesterification reactions between combinations of structurally different lactones, lactones with polyesters, lactones with copoly(ester/amides) and polyesters with polyesters. Also, lipases may be used to catalyze exchange reactions between polyesters and polycarbonates to form chains having mixed linkages such as, for example, ester/carbonate. Other lipase catalyzed exchange reactions may be between polyesters and polyethers to form copoly(ester/ethers) or polycarbonates and polyethers to form copoly(carbonate/ethers).

Reaction parameters such as the substrates, temperature, time, solvent (or the lack of one), lipase, and method of lipase activation can all be used to engineer the desired repeat unit sequence of copolymers. Also, the molecular weight of polymers used for exchange reactions is a critical parameter. For example, poly($\epsilon$-caprolactone-co-$\omega$-pentadecalactone), P(CL-co-PDL), was synthesized by variation in the substrates used to form the copolymer. The example copolymerizations are performed by lipase-catalyzed transesterification reactions between the following substrate pairs: $\epsilon$-CL/PDL, PCL/PDL, poly($\omega$-pentadecalactone) (PPDL)/$\epsilon$-CL, PPDL/PCL and poly(trimethylene carbonate-co-pentadecalactone), P(TMC-co-PDL). The preferred catalyst is Novozym-435 and the preferred solvent is toluene. All of the above reactions result in the formation of copolymers that differ substantially in their microstructure.

The invention discloses the use of lipase-catalyzed transesterification reactions between different preformed polymers as well as between polymers and monomers. This route to copolymers provides important elements of control over the copolymer repeat unit sequence. Furthermore, enzyme-catalysis provides a route that can have other benefits such as: i) decreased reaction temperatures relative to conventional chemical catalysts; ii) rapid ester interchange kinetics; and iii) selectivity over chain compositions that undergo interchange. The selectivity of preferred sites for ester interchange reactions can result from differences in the side group or main chain structural elements including variations in stereochemical composition. Thus, lipase-catalysis offers a new and powerful route to engineer copolymer structure during transesterification reactions.

It is an object of the present invention to provide a transesterification reaction to regulate copolymer structure.

It is another object of the present invention to provide a transesterification reaction to regulate copolymer structure that is lipase catalyzed and does not leave toxic residues in product polymers.

It is another object of the present invention to provide a transesterification is reaction to regulate copolymer structure that proceeds at lower temperatures thus reducing undesirable chain decomposition.

It is another object of the present invention to provide a transesterification reaction to regulate copolymer structure that does not lead to non-desired side reactions that decrease product molecular weight.

It is another object of the present invention to provide a transesterification reaction to regulate copolymer structure that does not lead to non-desired side reactions that produce colored substances.

It is another object of the present invention to provide a transesterification reaction to regulate copolymer structure that provides selectivity over the site at which chains are cleaved during exchange reactions.

These objects, and other objects, features and advantages of the present invention will become more apparent to those of ordinary skill in the art when the following detailed description of the preferred embodiments is read in conjunction with the appended figures.

DETAILED DESCRIPTION OF THE PREFERRED EMBODIMENTS

Figure 1A:
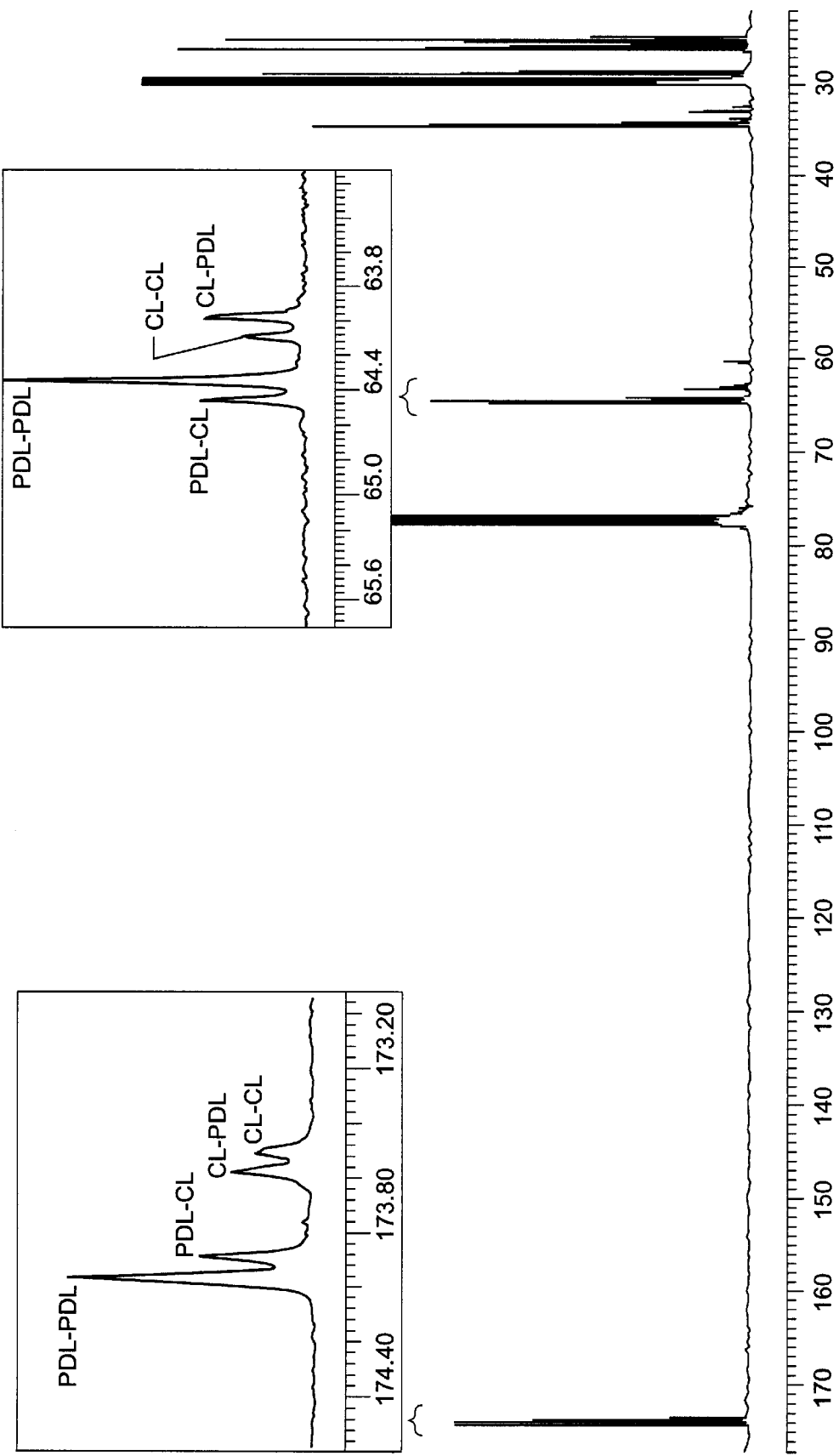
FIG. 1 is the $^{13}$C-NMR spectrum at 27° C. in CDCl$_3$ of the copolymer formed by ε-CL and PDL (1:1 W/W) after 1 min (FIG. 1a) and 4 hr (FIG. 1b) according to the method of the present invention.

The features and other details of the present invention, either as steps of the invention or as combinations of parts of the invention, will now be more particularly described. It will be understood that the particular embodiments of the invention are shown by way of illustration and not as limitations of the invention. The principle features of this invention can be employed in various embodiments without departing from the scope of the invention.

The present invention relates to an enzymatic transesterification method that provides a mild route for the regulation of copolymer repeat unit composition. In other words, this invention provides a method to create new copolymer compositions and unique sequences of repeat units by using a lipase to catalyze exchange reactions between polymer chains, between a polymer chain(s) and a monomer(s), and between monomers. The starting polymers may be chain structures having functional groups that can participate in the lipase-catalyzed formation of ester, amide or carbonate linkages.

The preferred general method to regulate copolymer structure using lipase-catalyzed transesterifications comprises the steps of:

a. Selecting a first reactant from the group consisting of polymers and monomers;
b. Selecting a second reactant from the group consisting of polymers and monomers; and
c. Combining the first reactant, the second reactant, and a lipase in a reaction vessel and allowing the ensuing transesterification reaction to proceed for a specified time resulting in a desired polymer.

The preferred polymers are selected from the group consisting of polyesters, polycarbonates, polymer chains of mixed linkage such as ester/amides, ester/ethers, ester/carbonates, ether/carbonates and other polymer chain structures. Further, the preferred polymer chains comprise functional groups at a chain end, within repeat units of chains, as part of pendant groups, or as chain branches that can participate in the lipase-catalyzed formation of ester, amide or carbonate linkages. The preferred monomers are selected from the group consisting of lactones and cyclic carbonates.

In the preferred method, the first reactant, the second reactant and the lipase are maintained at a temperature of between 25° C. and 105° C., preferably between 60° C. and 80° C., and more preferably at a temperature of approximately 70° C. In certain situations, it is preferable to maintain the reactants and/or the lipase under a nitrogen atmosphere. The transesterification reaction is allowed to continue for between 1 min and 24 hr, depending on the product polymer desired. Preferably, P(CL-co-85 mol % PDL) to P(CL-co47 mol % PDL) is used in the process.

The preferred lipases include the immobilized lipase from Candida antartica Lipase B (Novozym-435), PS-30, immobilized form of Candida antartica lipase B, immobilized lipase PS from *Pseudomonas fluorescens*, immobilized lipase PC from *Pseudomonas cepacia*, lipase PA from *Pseudomonas aeruginosa*, lipase from Porcine Pancreas (PPL), *Candida cylindreacea* (CCL), *Candida rugosa* (CR), *Penicillium roqueforti* (PR), *Aspergillus niger* (AK), and Lypozyme IM from *Mucor miehei*. Preferably, between 0.0001% to 20% by weight of the immobilized catalyst is used, and more preferably approximately 10% immobilized catalyst, that has between 0.0001% to 2% protein, and more preferably approximately 1% protein, provides satisfactory results.

It is preferable to have a solvent present in the reactant vessel. The preferred solvents include toluene, diisopropylether and isooctane. The range of solvent used is from 0.0% to 90% by weight. Although a solvent is not necessary, using an amount of solvent approximately twice the volume of the monomer has been found to provide satisfactory results.

In one embodiment of the invention, copolyesters of CL and PDL were prepared. The comonomers CL and PDL (See Table 1 for monomer feed ratios) were transferred simultaneously under a nitrogen atmosphere into reaction vials that contained the immobilized lipase (Novozym-435) and toluene at 70° C. The above reactants were stirred and the reaction was allowed to continue for times that varied between 1 min and 24 hr. The isolated yield of the reactions increased for reaction times of 1 min to 45 min and then plateaus.

Proton NMR spectra recorded at 300 MHz was unable to distinguish signals such as ($OCH_2$) that might otherwise have been used to resolve the diads. As shown in FIGS. 1 through 4, in the Carbon or $^{13}$C-NMR spectra, the diad sequences CL-CL, CL-PDL, PDL-PDL and PDL-CL were resolved by analysis of the $OCH_2$, $OCCH_2$ and $OCOCH_2$ carbons. The observed diad fractions in Table 1 were based on the sequence dependent $OCH_2$ $^{13}$C-NMR signals. The theoretical calculation of the diad fractions was carried out based on a series of equations that assume a Bernoulli or random statistical copolymerization of the two monomers. The lipase-catalyzed copolymerization (CL/PDL feed ratio, 1:1 mol/mol) carried out for 1 min and 15 min resulted in polymers that contained 69 mol % and about 50 mol % PDL, respectively. The number average molecular weights ($M_n$) and polydispersity index ($M_w/M_n$) of these products were 8400 g/mol and 17800 g/mol, respectively, and 2.5 and 2.4, respectively. The experimental or observed diad fractions for P(CL-co-69 mol % PDL) were as follows: CL-CL 0.11, CL-PDL 0.20, PDL-PDL 0.50, PDL-CL 0.19. Similarly, for P(CL-co-50 mol % PDL) the observed diad fractions were: CL-CL 0.26, CL-PDL 0.24, PDL-PDL 0.28, PDL-CL 0.22. As shown in Table 1, the observed and calculated diad fractions of P(CL-co-PDL) polymers formed using a 1:1 monomer feed ratio were in good agreement for reaction times from 1 min to 6 hr. Thus, when the PDL:CL feed ratio was 1:1, even reaction times as short as 1 min resulted in random polymers. One possible explanation for this behavior is that when a CL or PDL monomer unit is at the growing chain terminus, it will add with a probability approaching equality. Alternatively, such a random array of the repeat units could result from an active transesterification reaction pathway that caused rapid rearrangements of the chain sequence distribution.

Further study of PDL:CL polymerizations with a 1:1 monomer feed ratio revealed that the mole fraction of PDL in the copolyester product was higher at lower reaction times. In other words, as the reaction time was increased from 1 min to 15 min, the fraction of CL in the copolymer increased until CL and PDL in the product were nearly equimolar. Thus, PDL was more rapidly polymerized than CL. As shown in Table 1, the relative reactivity ratios of PDL and CL were calculated based on a series of experiments, carried out for 1 min, using PDL/CL feed ratios of 4:1, 2:1, 1:2, and 1:4. It is noteworthy that for these polymerizations carried out for 1 min, significant differences between experimental and calculated diad sequence values were found. The relative reactivity ratios of the monomers (PDL and CL) calculated using Fineman-Ross plot was found to be 12:1. Therefore, an active transesterification that causes rapid re-arrangement of the chain sequence distribution best explains the formation of random copolymers so that chains can rapidly re-arrange.

Figure 1B:
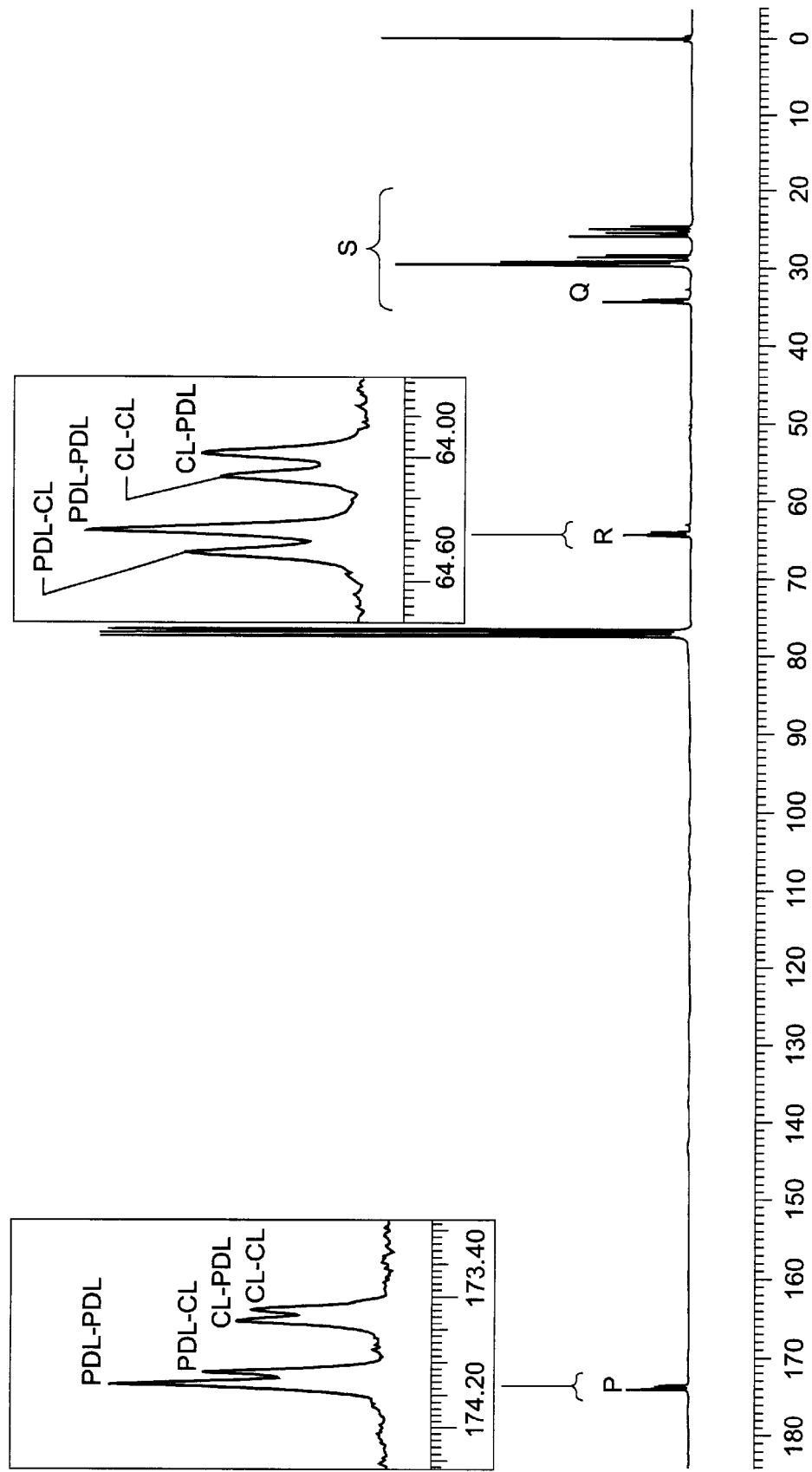
Figure 2:
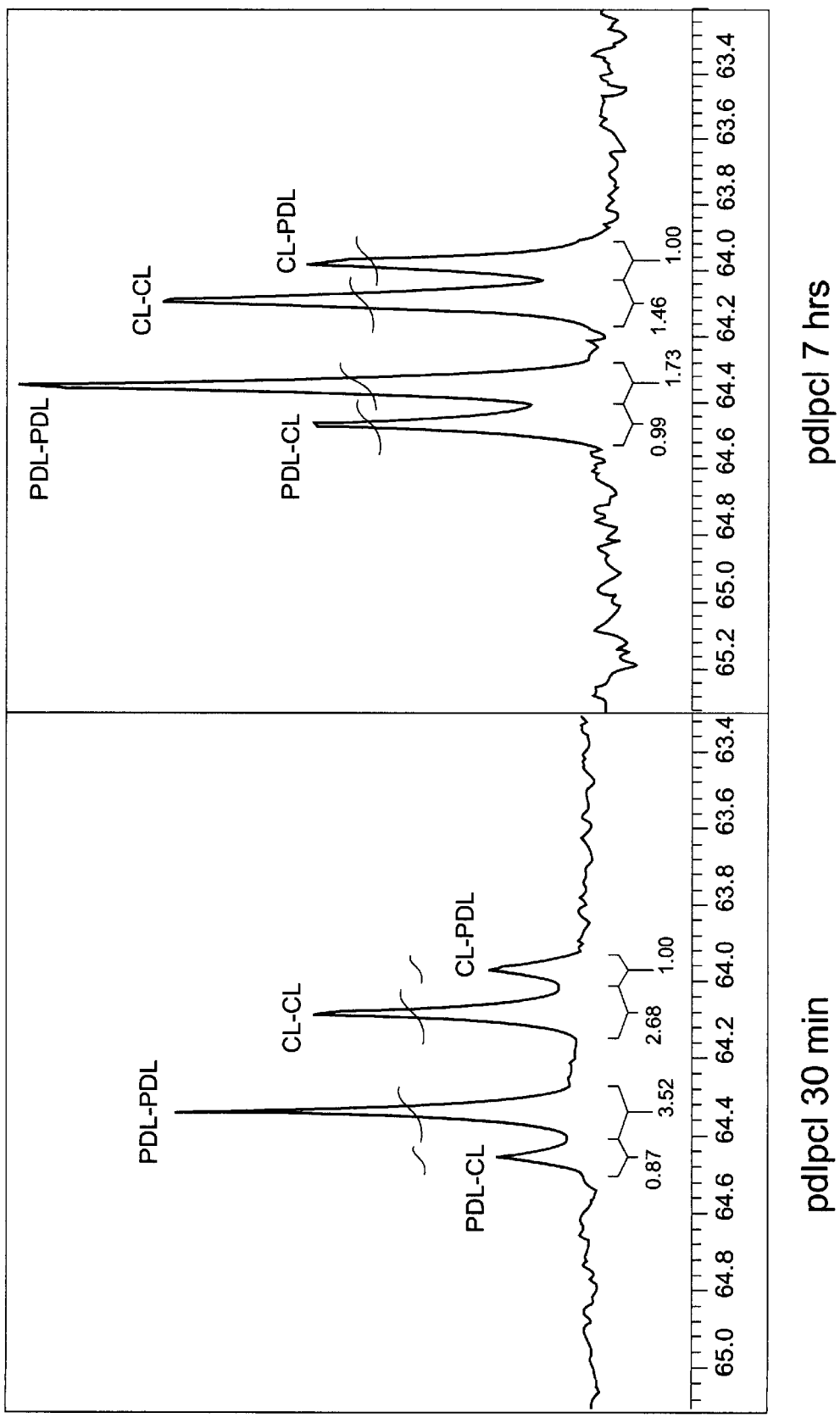
FIG. 2 is the $^{13}$C-NMR spectrum at 27° C. in CDCl$_3$ of the OCH$_2$ region of the copolymer formed by PCL ($M_n$ 8400 g/mol, PD 1.11) and PDL (1:1 W/W) after 30 min and 7 hr according to the method of the present invention.
Figure 3:
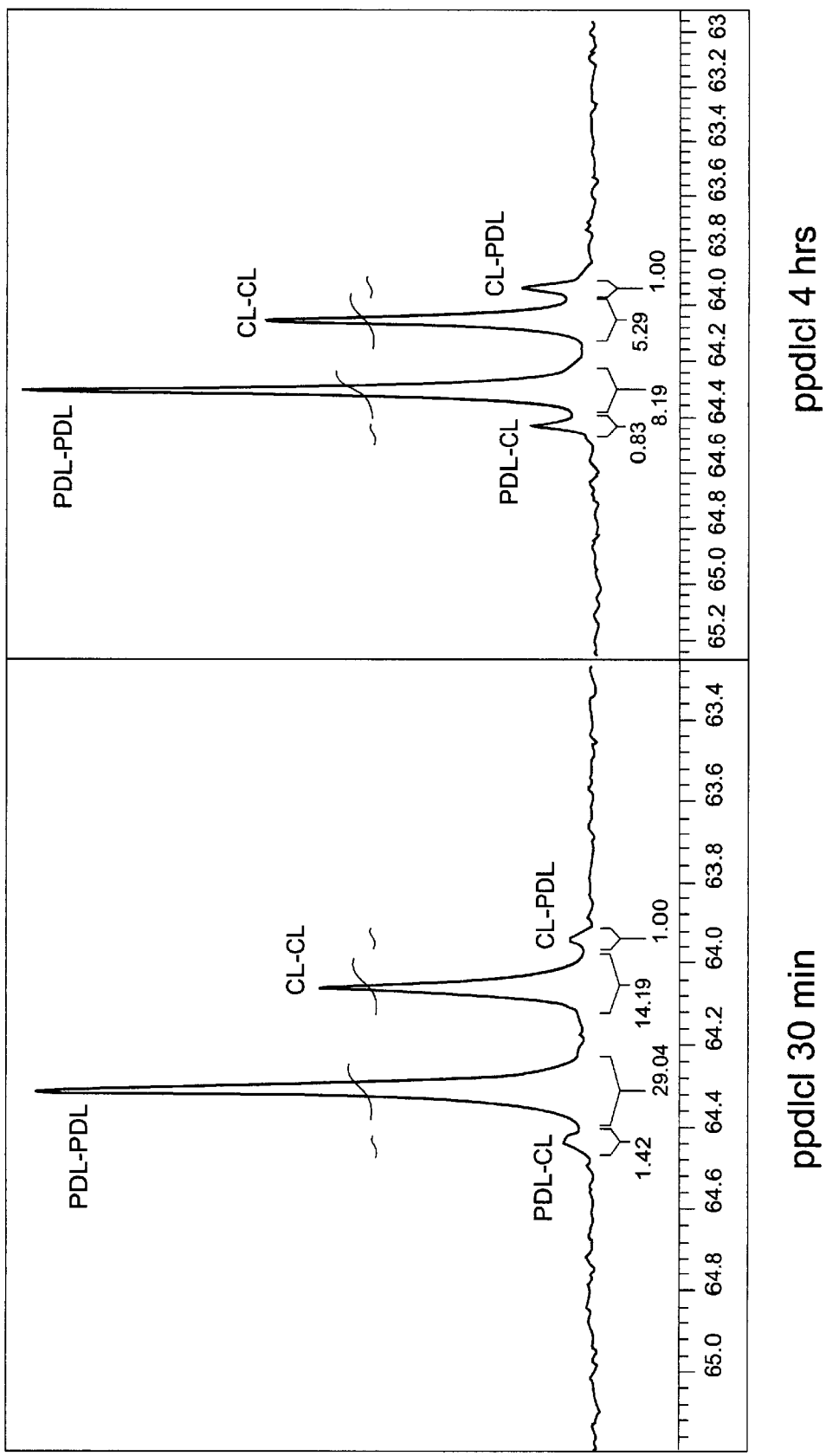
FIG. 3 is the $^{13}$C-NMR spectrum at 27° C. in CDCl$_3$ of the OCH$_2$ region of the copolymer formed by PPDL ($M_n$ 40200 g/mol, PD 1.71) and □-CL (1:1 W/W) after 30 min and 4 hr according to the method of the present invention.
Figure 4:
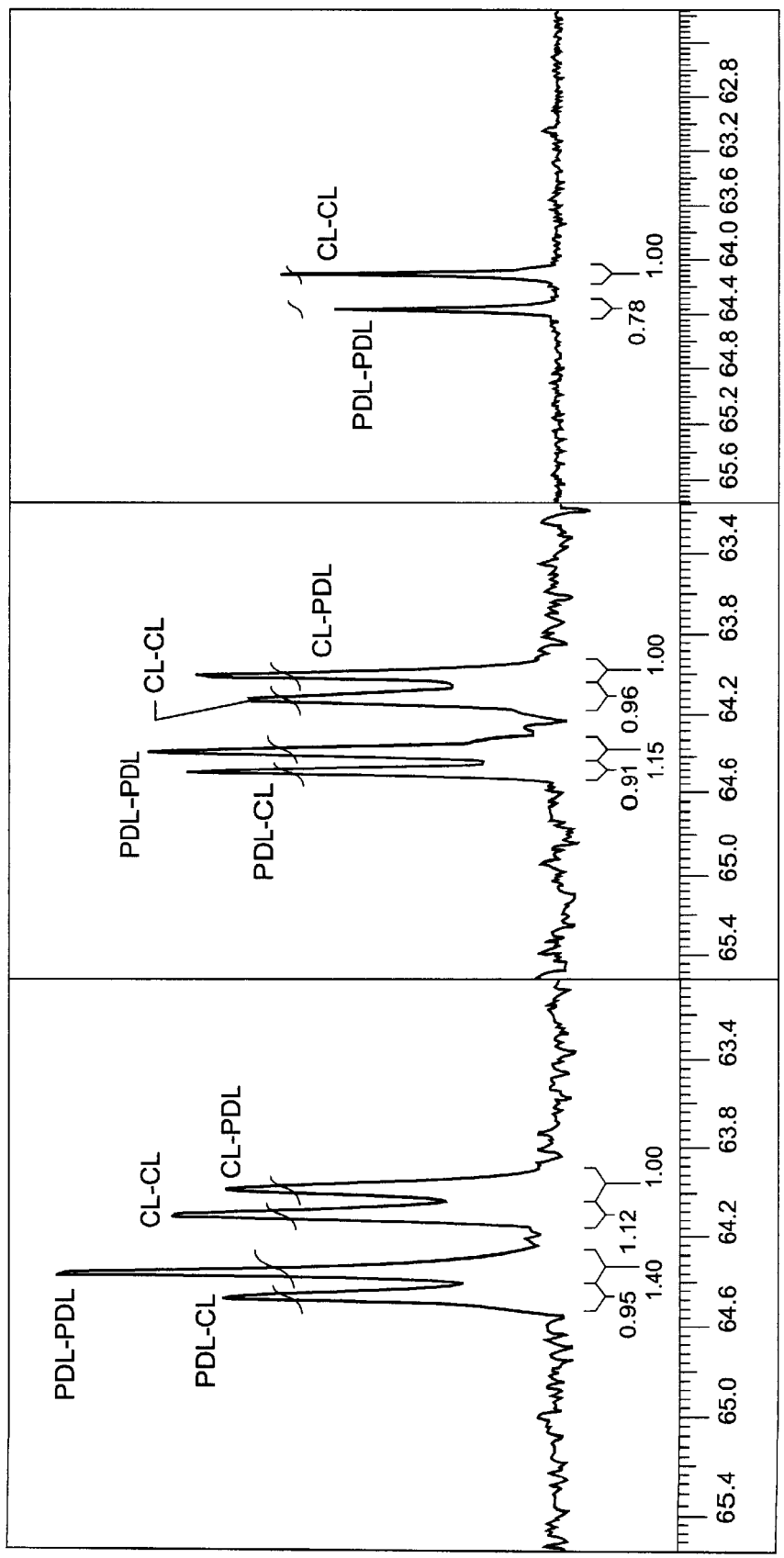
FIG. 4 is the $^{13}$C-NMR spectrum at 27° C. in CDCl$_3$ of the OCH$_2$ region of the copolymer formed from PPDL ($M_n$ 4300 g/mol, PD 2.39) and PCL ($M_n$ 9200 g/mol, PD 1.17) (1:1 W/W) after reactions for 1 hr in bulk, toluene and a control (without enzyme in toluene) according to the method of the present invention.
Figure 5:
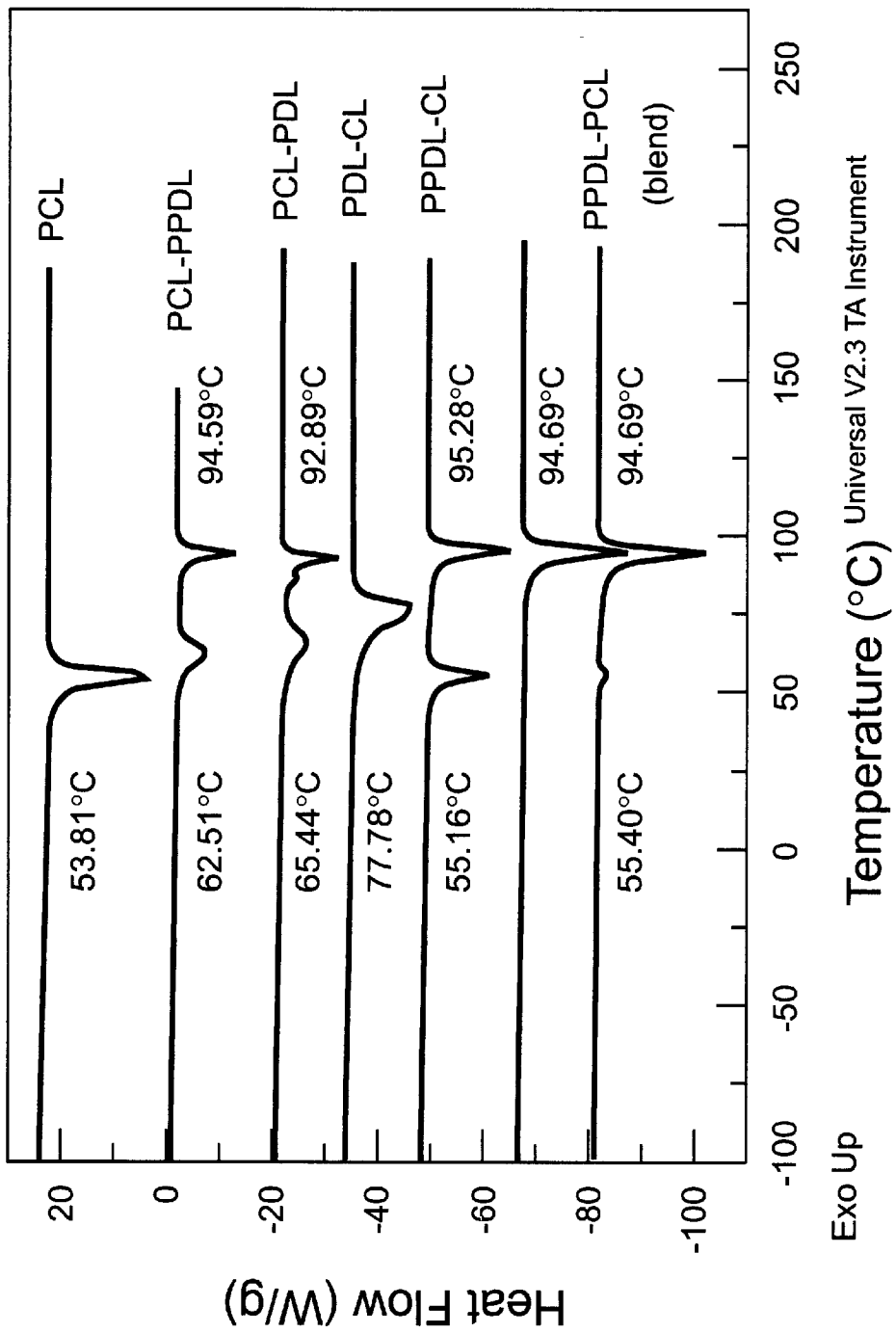
FIG. 5 is the DSC thermograms recorded at a 10° C./min heating rate of the starting homopolymers PCL ($M_n$ 8400 g/mol), PPDL ($M_n$ 16700 g/mol) and the copolymers formed by the reaction of CL-PDL (4 hr, $M_n$ 21200 g/mol), PDL-PCL (2 hr, $M_n$ 16400 g/mol), PPDL-CL (15 hr, $M_n$19500 g/mol), and PPDL-PCL (16 hr, $M_n$ 19700 g/mol) according to the method of the present invention.
Figure 6:
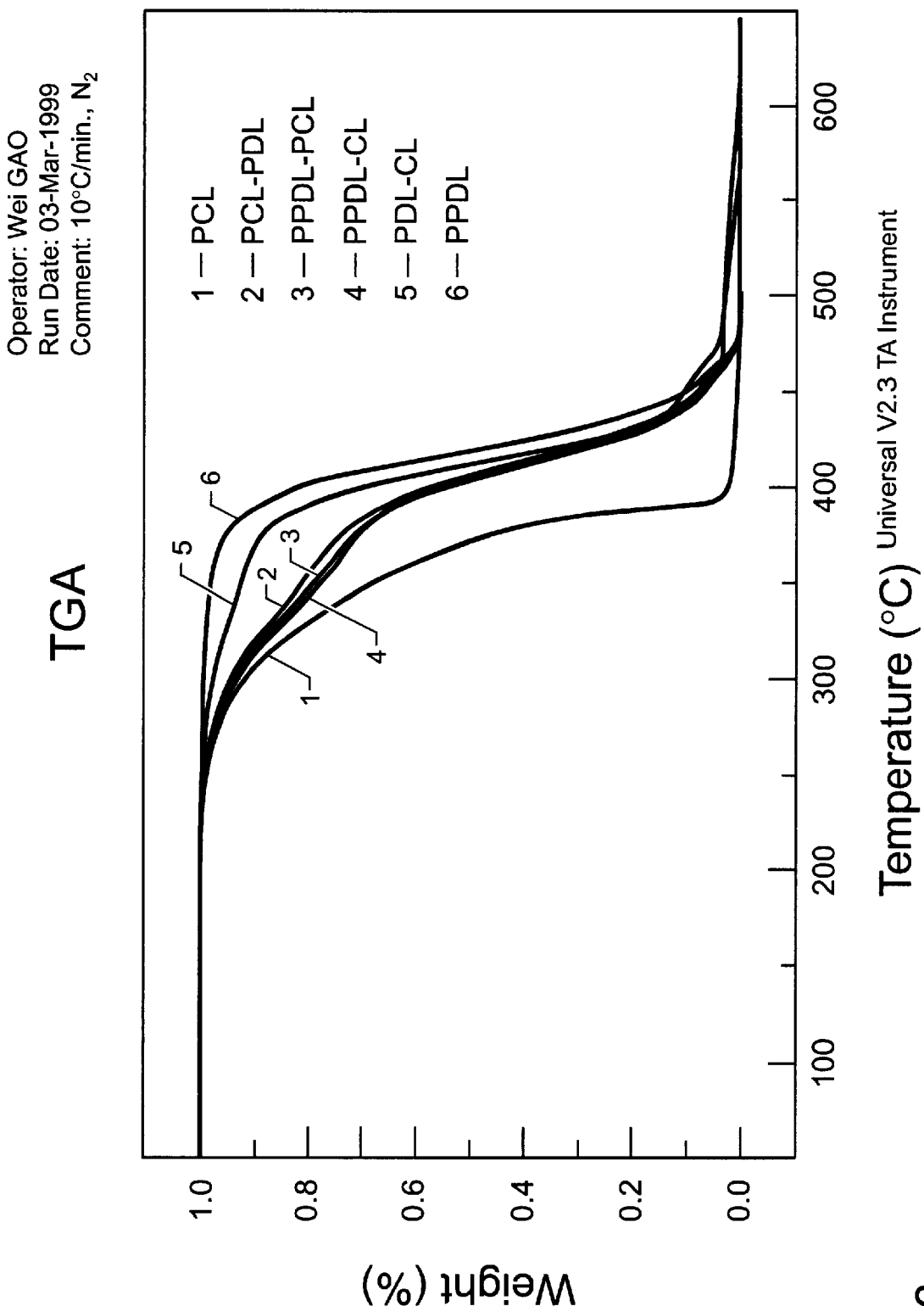
FIG. 6 is the TGA recorded at a 10° C./min heating rate of the starting homopolymers PCL ($M_n$ 8400 g/mol), PPDL ($M_n$ 16700 g/mol) and the copolymers formed by the reaction of CL-PDL (4 hr, $M_n$ 21200 g/mol), PDL-PCL (2 hr, $M_n$ 16400 g/mol), PPDL-CL (15 hr, 19500 g/mol), and PPDL-PCL ($M_n$ 19700 g/mol) according to the method of the present invention.
Figure 10:
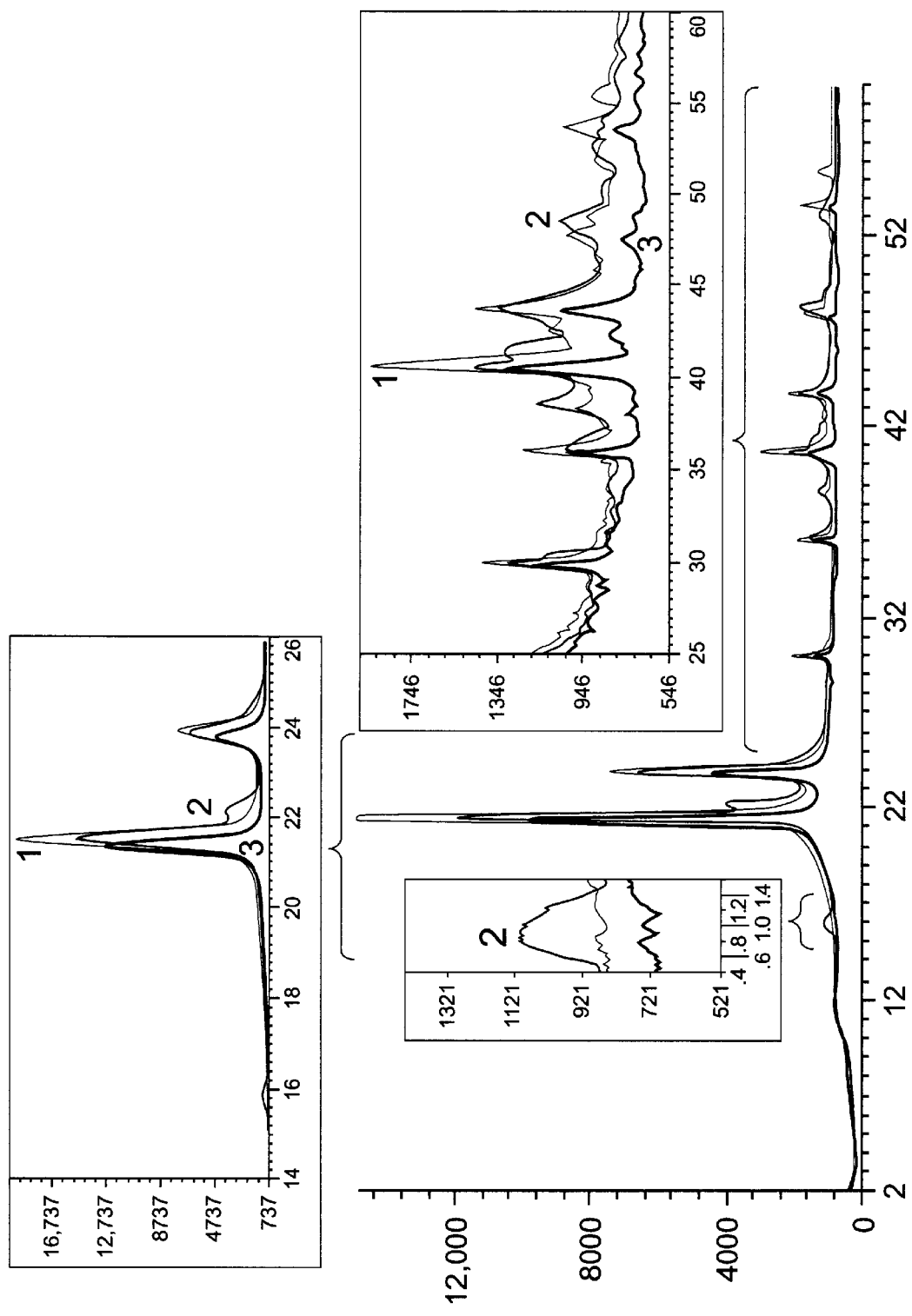
FIG. 10 is the wide angle X-Ray diffraction profiles for starting PPDL ($M_n$ 16700 g/mol), PCL ($M_n$ 8400 g/mol) and P(PDL-co-CL) ($M_n$ 21200 g/mol, Table 1) obtained by the Novozym-435 catalyzed PDL/CL copolymerization for 4 hr according to the method of the present invention.

As shown in Table 1, the GPC profile of copolymers having a molar feed ratio of 1:1 PDL/CL, were all unimodal. The $M_n$ of these copolymers increased with an increase in reaction time (1 min to 6 hr, 8410 g/mol to 22,300 g/mol). In addition, the polydispersity values generally decreased as the reaction time was increased from 1 min to 6 hr (2.5 to 1.9). As shown in FIG. 6 and Table 5, comparison of TGA thermograms showed that, relative to PCL, PPDL has a higher thermal stability. Similarly, as shown in FIG. 6 and Table 5, comparison of the TGA thermograms for P(CL-co-48 mol % PDL)(Compound 15, Table 1) and PCL showed that the former has a higher thermally stable. Furthermore, as shown in FIG. 6, the degradation behavior of P(CL-co-48 mol % PDL) resembles that of PPDL. The increase in the stability of this copolymer relative to PCL may be due to the presence of PDL and CL repeat units in close proximity. Indeed, as shown in FIG. 1B, $^{13}$C-NMR analysis of this product showed a statistically random distribution of PDL and CL repeat units. As shown in FIG. 5, the DSC thermogram of this product supported that it indeed had a random repeat unit sequence distribution. While PCL and PPDL have melting points of 54° C. and 95° C. respectively, P(CL-co-48 mol % PDL)(Compound 15, Table 1) has a melting point, 78° C., that is intermediate to these values. This suggests that CL in copolymer chain segments disrupts the organization of the PPDL crystalline phase. In other words, the copolymer crystalline phase is that of PPDL. As shown in FIG. 10, the wide angle X-ray diffraction pattern of P(CL-co-48 mol % PDL)(Compound 15, Table 1) synthesized by reacting ω-PDL with ε-CL for 4 hr in toluene showed highly resolved crystalline reflections superimposed on a low intensity amorphous halo indicating high crystallinity. In addition, the crystalline reflections of P(CL-co-48 mol % PDL)(Compound 15, Table 1) with maximum intensity (100%) at angle 21.62 resembled closely that of PPDL (21.56). In contrast, the maximum intensity diffraction band for homo-PCL is at 21.4. The diffraction bands due to the crystalline PCL phase that were observed for PCL homopolymer at angles (intensity) of 22.18(27%), 30.38 (8%), 30.68(8%), 41.44(9%), 48.54(7%) were missing in P(CL-co-0.48 mol % PDL) and PPDL. Moreover, the diffraction band observed for PPDL but not for PCL homopolymer, at an angle of 53.62, was seen for P(CL-co-48 mol % PDL). Hence, the X-ray diffraction results support the conclusion that P(CL-co-48 mol % PDL) is semicrystalline and has the crystalline structure of PPDL.

In another embodiment of the invention, PDL was polymerized as above for 3 hr (<90% conversion). Subsequently, CL was added to the reaction vessel (1:1 molar ratio, CL/PDL), and the reaction was maintained at 70° C. with agitation. The reaction was continued for up to 21 hr and the polymer was isolated following the exact procedure as mentioned in exemplification (general procedure to copolymerization). The resulting product, P(CL-co47 mol % PDL)(Compound 1, Table 1), had an $M_n$ of 18300 g/mol and PD of 1.97. The observed diad fractions for P(CL-co47 mol % PDL) were: CL-CL 0.30, CL-PDL 0.23, PDL-PDL 0.26, PDL-CL 0.21. As shown in Table 1, comparison of the observed and calculated diad fractions shows that this product best approximates random statistics. Thus, transesterification occurred between PPDL and CL so that a random copolymer was formed.

In another embodiment of the invention, preformed PCL ($M_n$=9200 g/mol, $M_w/M_n$=1.17, 1.5 mmol, 171 mg) and PDL (1.5 mol, 360 mg) were transferred together into reaction vials (10 mL Pyrex culture tubes) that contained Novozym-435 (53 mg), toluene (1.3 g) and were maintained under a nitrogen atmosphere with an external bath temperature of 70° C. The reactions were stirred for 5 min, 15 min, 30 min, 45 min, 2 hr, 4 hr, 6 hr and 7 hr, respectively. The yield of reactions increased from 5 min (66%) to 2 h (83%) and then plateaus.

The observed diad sequence fractions of these products are displayed in Table 2 and were calculated based on the OCH$_2$ signal in $^{13}$C-NMR spectra. P(CL-co-39 mol % PDL) (Compound 1, Table 2, $M_n$ 13200 g/mol, $M_w/M_n$ 2.26), formed after 5 min, was blocky based on $^{13}$C-NMR studies. P(CL-co-56 mol % PDL)(Compound 5, Table 2, $M_n$ 16400 g/mol, $M_w/M_n$ 2.13), formed after 2 hr, also appeared blocky but had a greater extent of CL-PDL and PDL-CL diads. Comparison of the observed and calculated diad values (Bernoullian or random statistics for copolymerization of two monomers) in Table 2 of PDL-co-PCL polymers showed poor agreement. In addition, the deviation between observed and calculated values was greater at shorter reaction times. This shows tendency towards the formation of larger blocks or presence of some preformed homopolymer at shorter time periods (5 min–15 min). As shown in Table 2, it was observed that the average statistical sequence length ($\mu_{CL}$) (calculated based on F. T. Wall. J. Am. Chem. Soc, 66, 2050,1944), repeat units changes from 20 to 3, whereas $\mu_{PDL}$ changes from 13-3 over the reaction period (5 min to 7 hr).

Figure 11:
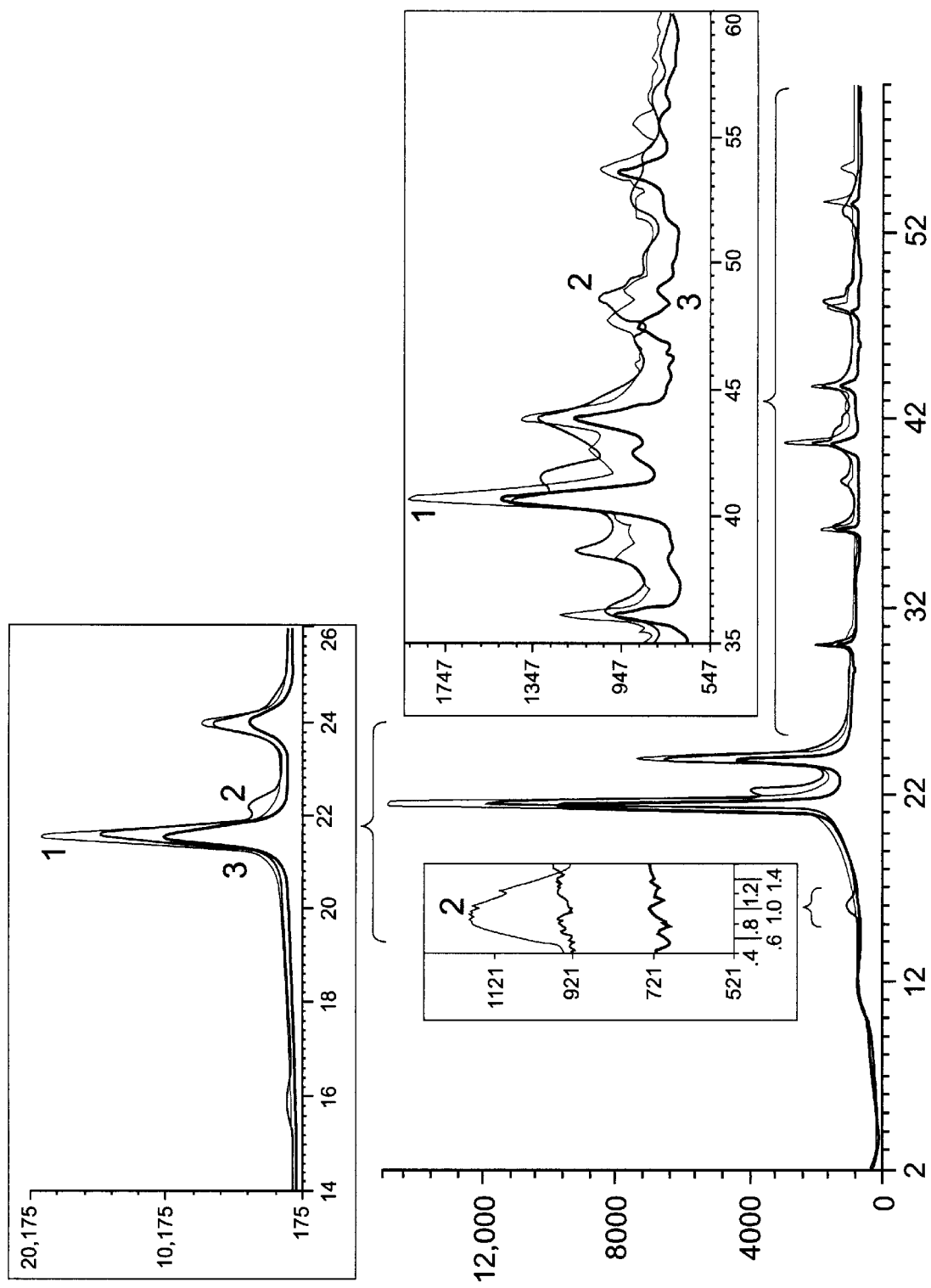
FIG. 11 is the wide angle X-Ray diffraction profile for starting PPDL ($M_n$ 16700 g/mol) and PCL ($M_n$ 8400 g/mol) and the P(PDL-co-CL) ($M_n$ 15100 g/mol, Table 2) obtained by Novozym-435 catalyzed copolymerization of PDL with PCL ($M_n$ 8400 g/mol) for 4 hr according to the method of the present invention.

TGA analysis of P(CL-co-52 mol % PDL) (Compound 6, Table 2, FIG. 6) shows two distinct step transitions corresponding closely to those for PCL and PPDL homopolymers. The DSC thermogram of the copolymer in FIG. 5 shows two melting points at 65° C. and 93° C. The higher melting transition is close to that of PPDL homopolymer (95° C.) while the lower melting transition is slightly above that of PCL homopolymer (51° C.). Thus, the thermal degradation and DSC results are consistent with the $^{13}$C-NMR analysis that describes the product as blocky. This also supports the calculation of average sequence lengths ($\mu_{CL}$, and $\mu_{PDL}$). The WAXS pattern of P(CL-co-52 mol % PDL) (Compound 8, Table 2) is shown in FIG. 11. The X-ray chromatogram displayed highly resolved crystalline reflections superimposed on a small amorphous halo indicating a high level of crystallinity. In addition, the crystalline reflections of P(CL-co-52 mol % PDL) synthesized by reacting PCL (8400 g/mol) with ω-PDL for 4 hr had the maximum intensity (100%) diffraction band at angle 21.66. This resembled closely that of semicrystalline PPDL homopolymer (21.56) while PCL had a similar diffraction band at 21.41. The diffraction bands assigned to PCL at angles (intensities) of 22.18(27%), 30.68(8%), 41.44(9%), 48.54 (7%) were absent in the X-ray chromatograph for P(CL-co-0.52 mol % PDL) and PPDL. Moreover, the X-ray diffraction band that was observed for PPDL and not for PCL at 53.56 was present for compound 8 in Table 2. Thus, it appears that both melting transitions at 65° C. and 93° C. are due to PPDL crystalline phases. The lower melting transition corresponds to a disrupted PPDL crystalline phase due to the presence of CL units.

Figure 7:
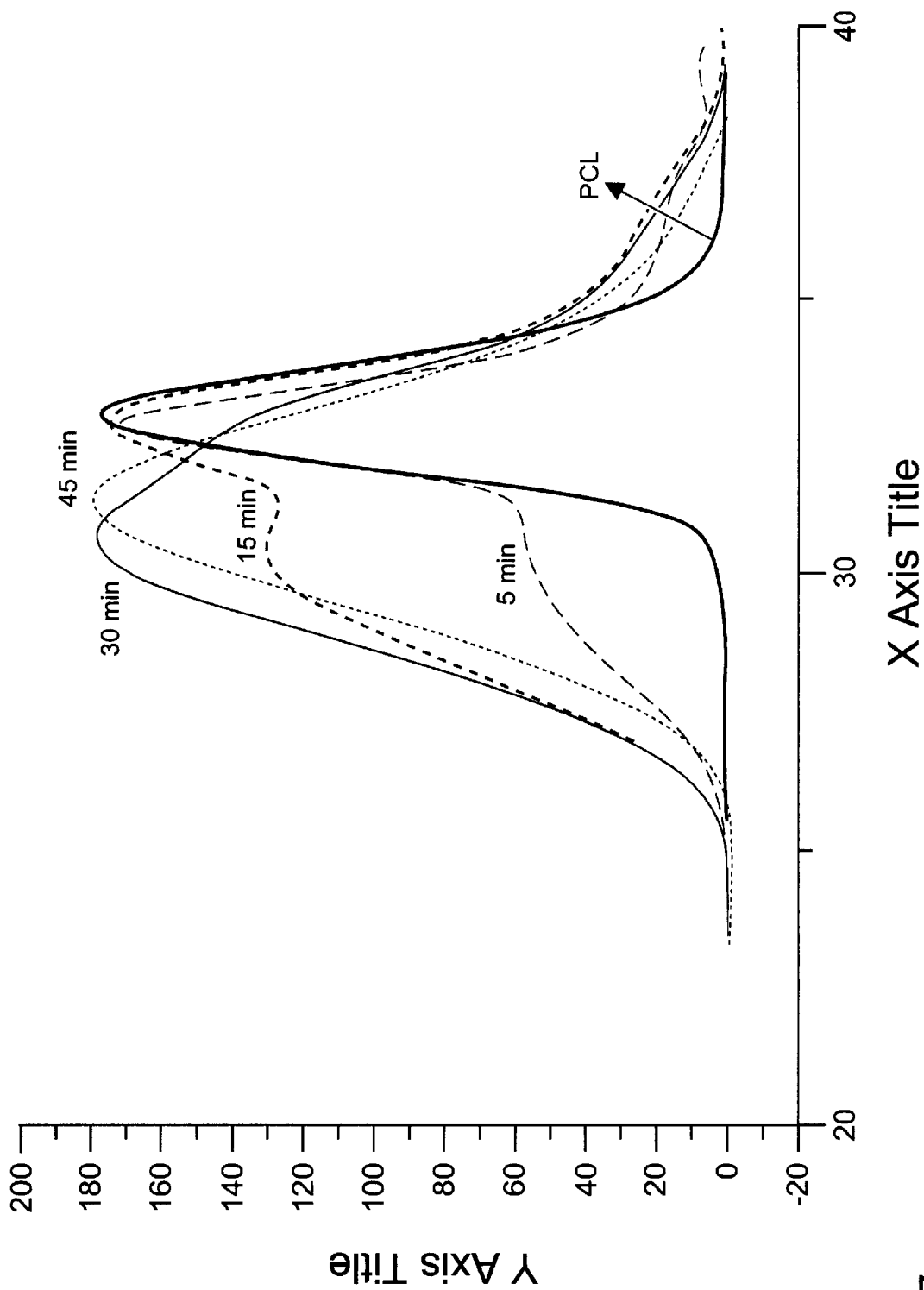
FIG. 7 is the GPC traces of starting PCL ($M_n$ 8400 g/mol, PD 1.11) and Novozym-435 catalyzed copolymers formed by the reaction between PDL and PCL ($M_n$ 8400 g/mol, PD 1.11) for 5 min to 45 min according to the method of the present invention.

The GPC data in FIG. 7 (5 min–45 min) showed interesting results. The appearance of the two peaks at 5 min (major corresponding to PCL), decrease in the PCL intensity with time and then formation of an unimodal peak after 45 min with high molecular weight suggests that all the PCL chain had either PDL grown at the end or transesterified to give copolymer with high molecular weight. Both $\mu_{PDL}$ and $\mu_{CL}$ in the copolymer changed from 18 to 3 over the reaction period (5 min to 7 hr), suggesting the transesterifaction pathway. As shown in FIG. 7, the GPC profile of one of the reaction of the copolymers had a $M_n$ of 15000–17000 g/mol, which is considerably increased from its starting PCL, which had a $M_n$ of 9200 g/mol.

In another embodiment of the invention, preformed PPDL ($M_n$=40200 g/mol, $M_w/M_n$=1.71, 720 mg) and CL (342 μL) were transferred together into reaction vials (10 ml Pyrex culture tubes) that contained Novozym-435 (106 mg) and toluene (2.68 g). The reactions were maintained under a nitrogen atmosphere with an external bath temperature of 70° C. for 3 min, 5 min, 15 min, 30 min, 1 hr, 2 hr and 4 hr respectively. The yield of the reactions increased from 65% to 82% for reaction times of 5 min and 15 min, respectively. Multiblock P(CL-co-55 mol % PDL) ($M_n$ 26500 g/mol, $M_w/M_n$ 2.8) was formed in 15 min and P(CL-co-61 mol % PDL) ($M_n$ 18600 g/mol, $M_w/M_n$ 3.0) in 4 hr. Diad sequence fractions in Table 3 were determined by $^{13}$C-NMR analysis of the copolymer OCH$_2$ signals. The observed diad fractions for P(CL-co-55 mol % PDL) were: CL-CL 0.42, CL-PDL 0.03, PDL-PDL 0.51, PDL-CL 0.03; and for P(CL-co-61 mol % PDL) were: CL-CL 0.33, CL-PDL 0.06, PDL-PDL 0.55, PDL-CL 0.06. The observed and calculated values (Bernoullian or random statistics for copolymerization of two monomers) in Table 3 of PDL-co-PCL copolymers are very different and indicate a tendency toward the formation of long homo-CL ($\mu_{CL}$ 27) and homo-PDL ($\mu_{PDL}$ 82) chain sequences.

Figure 8:
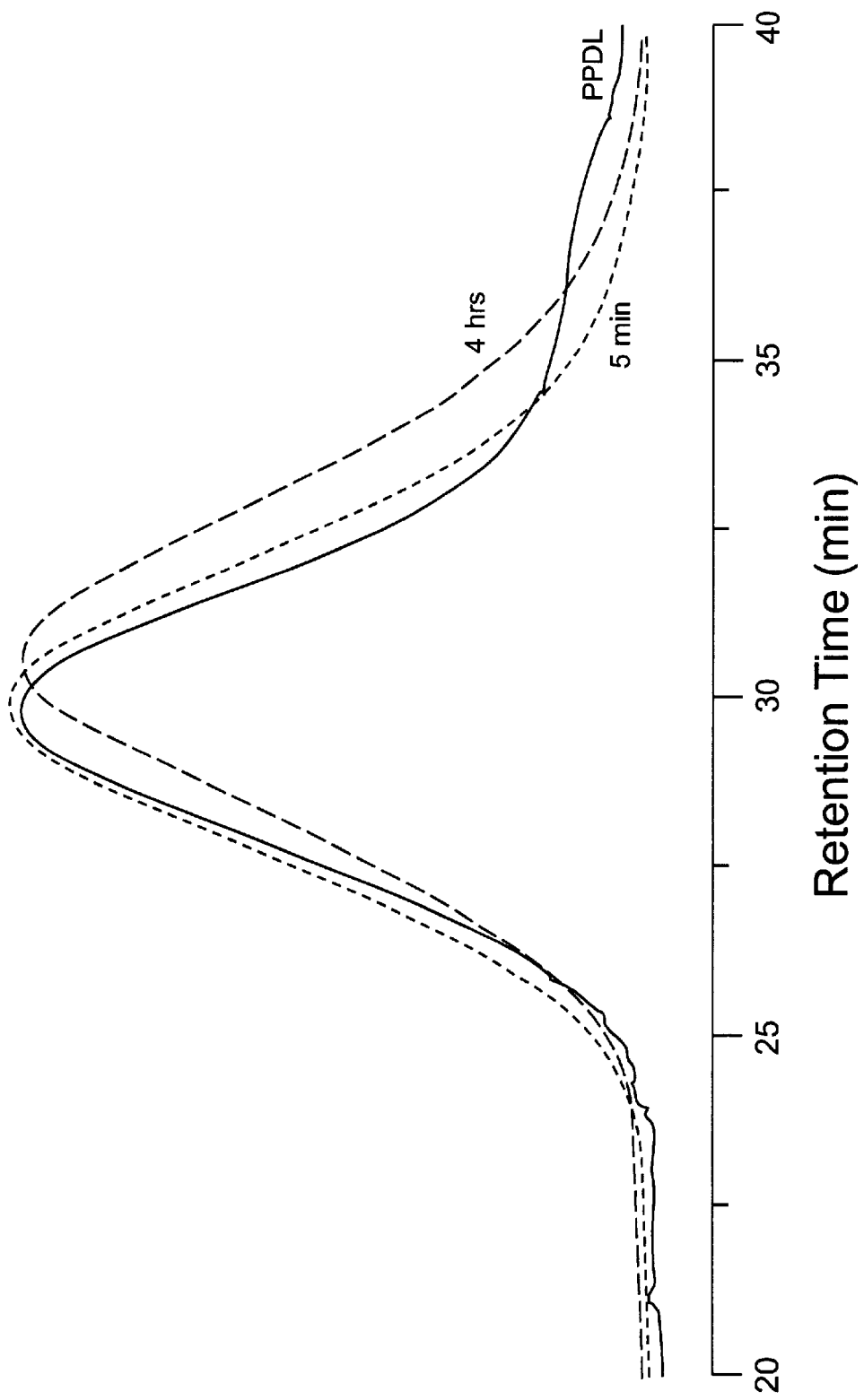
FIG. 8 is the GPC traces of starting PPDL ($M_n$ 40200 g/mol, PD 1.71) and Novozym-435 catalyzed copolymers formed by the reaction between PPDL and ε-Cl for 5 min to 4 hr according to the method of the present invention.
Figure 9:
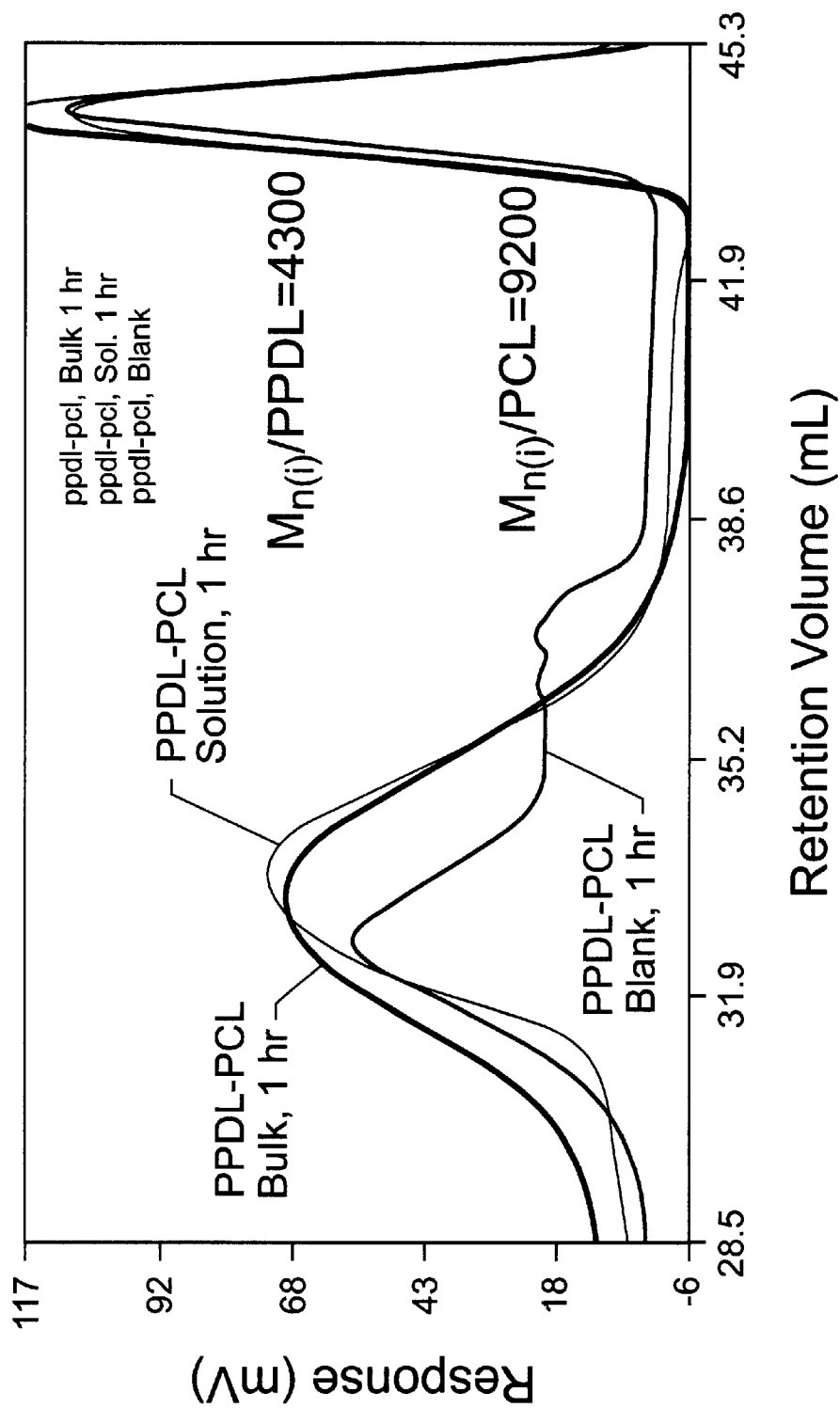
FIG. 9 is the GPC traces of the products formed by reacting PPDL ($M_n$ 4300 g/mol) and PCL ($M_n$ 9200 g/mol) in a control reaction (i.e. without enzyme) and catalyzed by Novozym-435 according to the method of the present invention.

Another experiment was performed under similar conditions but with PPDL ($M_n$ 16700 g/mol, PD 2.15), a ratio of PPDL to CL of 2:1 W/V, and reaction times of 15 h. After a 15 hr reaction time, P(CL-co-34 mol % PDL) was formed with ($M_n$ 19500 g/mol, $M_w/M_n$ 1.78). The observed diad fractions for this copolymer were: CL-CL 0.35, CL-PDL 0.15, PDL-PDL 0.37, PDL-CL 0.13. It was observed (Table 3) that the average statistical sequence length of PCL ($\mu_{CL}$) decreases from 15 to 7 and PPDL ($\mu_{PPDL}$) from 18 to 8 with an increase in reaction time from 15 min to 4 hr. The values of ($\mu_{CL}$) and ($\mu_{PPDL}$) in P(CL-co-34 mol % PDL) was 4 and 3, respectively. The thermal degradation of P(CL-co-34 mol % PDL)(Compound 1, Table 3) has two component transitions that correspond to the respective homopolymers. The DSC thermogram in FIG. 5 shows that compound 1 of Table 3 has melting transitions at 55° C. and 95° C. that likely corresponds to melting of PCL- and PPDL-type crystalline phases. Thus, DSC and TGA results further confirm that this product has a multiblock-type structure. As shown in FIG. 8, all the samples (starting PPDL $M_n$ 40200 g/mol showed a unimodal peak with decrease in molecular weight, whereas the profile for (starting PPDL $M_n$ 16700) showed an increase in molecular weight.

In another embodiment of the invention, transesterification reactions between PCL and PPDL homopolymers were demonstrated. In this embodiment, the effect of the molecular weight of the starting homopolymers was considered. PCL samples having molecular weights of 9200 and 44000 g/mol, and PPDL samples having molecular weights of 4300, 16700 and 40000 g/mol, were studied. PCL (171 mg) and PPDL (360 mg) were transferred together into reaction vials (10ml Pyrex culture tubes) that contained Novozym-435 (53 mg). Reactions were carried out in bulk or with the addition of toluene (1.3 g). The reactions were maintained under a nitrogen atmosphere, with an external bath temperature of 70° C., with stirring, for reaction periods from 15 min to 30 hr (see Table 4 for reaction conditions). The yields of products 2–4 (Table 4) from reactions carried out for 15 min to 1 hr in bulk decreased from 73% to 70%. Comparison of products 4–5 showed that the use of toluene instead of bulk reaction conditions resulted in decrease in product yields (about 7%). This may be due to the formation of more low molecular weight product, which gets washed during precipitation. No transesterification was observed when the two polymers were mixed for 1 hr without enzyme (compound 1, Table 4). This conclusion was made as no change in molecular weight and CL-PDL diads were observed. For 15 min with enzyme (compound 2, Table 4) there was decrease in $M_n$ (3290 g/mol, PD 3.13) but no CL-PDL diads were observed. This may be due to low level of transesterification reactions that may be occurring that are below the detection limit of the analytical methods used. Such reactions, even those that occur only at low level, can have significant impact such as in the formation of diblock interfacial agents. With increase in the reaction time to 30 min and 1 hr (in bulk, starting PPDL 4300, PCL 9200 g/mol, compound 3–4, Table 4), CL-PDL and PDL-CL diads were observed and with increased $M_n$ (8600, 8290 g/mol). With lapse in time the product 3–4 resulted in large to short block copolymer formation ($\mu_{CL}$ 18 to 2, $\mu_{PDL}$ 23 to 2). Reactions in toluene with similar and comparatively high molecular weight preformed polymers were studied for 1 hr (compound 5–9, Table 4). It was observed that the average sequence length ($\mu_{CL}$, $\mu_{PDL}$ in Table 4) increased with increase in polymer molecular weight. The observed diad sequence fractions of products (compounds 1–9, Table 4) were based on $OCH_2$ signals in the $^{13}$C-NMR spectrum. To further investigate the effects of reaction time on randomness of tranesterification reaction, PPDL and PCL having $M_n$ values of 40000 g/mol and 44000, respectively, were studied (compound 9, Table 4). The reaction was carried out in toluene for 30 hr and gave poly(CL-co-50 mol % PDL) ($M_n$ 17200, $M_w/M_n$ 2.17) with diad fractions of CL-CL 0.26, CL-PDL 0.25, PDL-PDL 0.27, PDL-CL 0.23. Increase in reaction time decreases the average sequence length ($\mu_{CL}$, $\mu_{PDL}$) as shown in Table 4.

Table 4 lists the observed and calculated diad fraction values (assuming Bernoullian or random copolymerization statistics) for PPDL-co-PCL polymers from reactions between PCL ($M_n$ 9200 g/mol) and PPDL ($M_n$ 4300 g/mol). Solventless or bulk reactions carried out for 30 min gave a product that deviated from that of a random copolymer. However, increasing the reaction time to 1 hr led to a product that approached a random statistical distribution (compound 4, Table 4). Similarly, transesterification reactions conducted in between PCL ($M_n$ 44000, PD 1.65 and PPDL ($M_n$ 40000, PD 1.71) resulted in a multiblock copolymer ($M_n$ 64700, PD 1.97) after a 1 hr reaction. However, increasing the reaction time to 30 hr using same condition gave a product ($M_n$ 17200, PD 2.17) that appeared random. Analysis of $\mu_{CL}/\mu_{PDL}$ for compound 34 in bulk decreased from 18/23 to 2/2 with increase in the reaction time from 30 min to 1 hr. Reactions in toluene between PCL (44000 g/mol) and PPDL ($M_n$ 40000 g/mol) (1:1 mol/mol, always the same amount of polymer in toluene) gave P(CL-co-50 mol % PDL) that had $\mu_{CL}/\mu_{PDL}$ values after 1 hr and 30 hr of 19/21 and 2/2, respectively. The above suggests that the rate of transesterification between preformed polyesters is molecular weight dependent such that chains of relatively lower molecular weight react more rapidly.

Tranesterification between chains apparently occurs by the activation of a chain carbonyl by the lipase-catalyzed cleavage of an interchain ester group. This is reaction would lead to the activation of an interchain carbonyl group and the formation of a chain fragment. Subsequently, reaction between the terminal hydroxyl group of another chain with the activated enzyme complex will give productive transesterification reactions. Presently, it is currently not known whether the effects of molecular weight on these reactions occur throughout the range of possible chain lengths, or these effects are limited to molecular weight changes that are above or below certain critical molecular sizes. Nonetheless, that transesterification between chains of higher molar mass occurs more slowly than for corresponding reactions of lower molecular weight is consistent with the disclosed reaction mechanism. In other words, chains of lower mass will have a higher concentration of hydroxyl terminal chain ends per unit weight. A higher concentration of chain ends would be expected to lead to more rapid reactions with the activated carbonyl of a chain segment.

Alternatively, it may be that the first step or formation of the activated enzyme ester will occur more rapidly with chain of lower molecular weight.

As shown in FIG. 6 and Table 5, the thermal degradation of P(CL-co-50 mol % PDL) (PCL-PPDL, compound 6, Table 4) at the first step is more close to PCL and the second step is more like PPDL. Appearance of both the PCL and PPDL like TGA patterns suggests that product to be blocky. The DSC thermogram of this sample had two melting points at 63° C. and 95° C. In comparison with the blends (by mixing under similar condition but without enzyme, melting points at 55.40° C. and 94.69° C.) it is much different. Hence the product formed supports multiblock copolymer formation.

Figure 12:
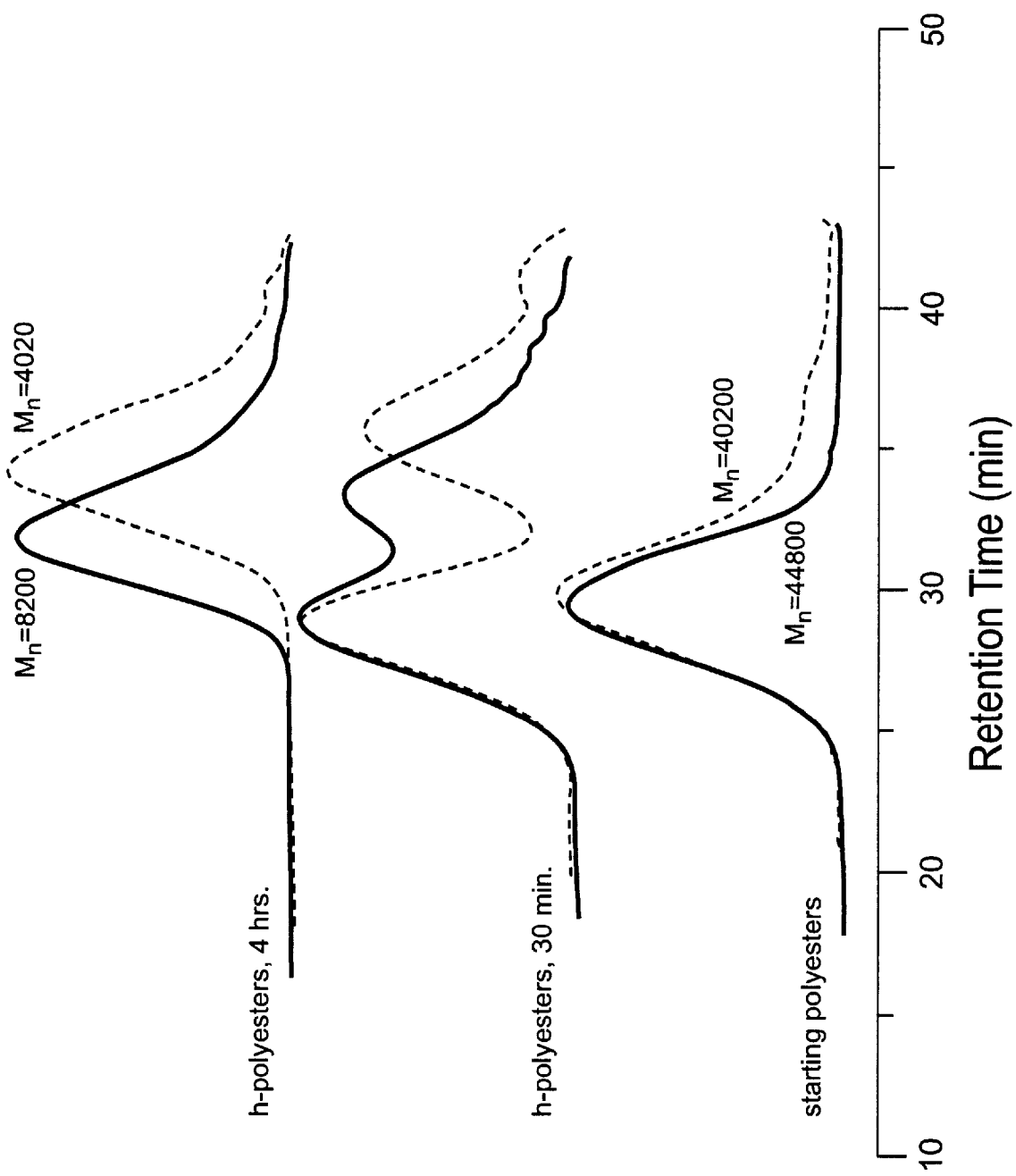
FIG. 12 is the GPC traces for the Novozym-435 catalyzed transesterification reactions of hexanol with PCL ($M_n$ 44800 g/mol, PD 1.71) and PPDL ($M_n$ 40200 g/mol, PD (FIG. 1a) 1.71) for 30 min and 1 hr according to the method of the present invention.

Experiments were also performed to determine whether the PCL or PPDL chains are more easily activated by lipase and whether it is activated at the end, randomly along the chain or preferrentially at some distance from a chain end. PPDL ($M_n$ 40000, Pd 1.71, 1 g) or PCL ($M_n$ 44000, Pd 1.65, 1 g) were transferred into reaction vials (10 ml Pyrex culture tubes) that contained Novozym-435 (106 mg), hexanol (CL units/OH groups=22, 0.02 g) and toluene (2.6 g). The reaction was maintained under a nitrogen atmosphere with an external bath temperature of 70° C. for 30 min and 4 hr respectively. The $^1$H-NMR of the reaction mixture showed that the hexanol consumption and hexanol ester formation increased with time. FIG. 12 shows the GPC profiles of the hexanol/PPDL (solid line) and hexanol/PCL (dotted line) transesterification reactions at 30 min and 4 hr. For both reactions, a bimodal distribution is observed at 30 min. Increasing the reaction time from 30 min to 4 hr results in the formation of a product with a single peak (unimodal distribution) with $M_n$ values at 4020 and 8200 g/mol for the PCL/hexanol and PPDL/hexanol reactions, respectively. This suggests that Novozym-435 catalyzed esterification with hexanol is chain length (hydrodynamic volume) selective. The chain selectivity argument comes from a comparison of the lower molecular weight peak formed as a function of reaction time. If the peak at 30 min at lower molecular weight is similar to that at 4 hr, this indicates that the reaction between the lipase and PCL or PPDL occurs with specificity with respect to chain length. Thus, there is some degree of uniformity in the chain length of segments that are activated by the lipase and subsequently cleaved to form their corresponding hexyl ester derivative. The $M_n$ of such fragments appears to be 4020 and 8200 g/mol for PCL and PPDL, respectively. Thus, PCL chains are activated at a carbonyl that is on average 35 repeat units from the hydroxyl chain end. Similarly, PPDL chains are activated at a carbonyl that is on average 34 repeat units from the hydroxyl chain end. Enzymatic cleavage by transesterification with hexanol continues, additional segments are cleaved from the same chain and other chains forming additional hexyl ester chain fragments with an average d.p. of 35. These smaller fragments are not good substrates for further activation and transesterification with hexanol so that they accumulate and become the major product of the reaction.

This process of forming copolymers of mixed linkage, or by reaction of a preformed polymer with a monomer, has great potential for generating many useful products. Such reactions will be particularly useful when direct copolymerization of the monomer is difficult or when there is a need to incorporate an additional repeat unit into a polymer subsequent to its synthesis. For example, copolymerization of benzyl malanolactone with PDL catalyzed by Novozym-435 is difficult as was mentioned in embodiment 1. However, Novozym-435 catalyzed transesterifications between polybenzylmalanolactone and PDL is a much more efficient route to the formation of these copolymers under comparably reaction conditions. The lipase-catalyzed synthesis of copolymers that contain mixed ether/ester linkages was demonstrated by reactions of PEG with PCL, PEG with CL or PEG with PDL. Similarly, the lipase-catalyzed syntheses of copolymers that contain mixed ester/carbonate linkages were also demonstrated and are examples of this invention. The latter mixed linkage copolymers were prepared by reactions of PDL with TMC, PPDL ($M_n$ 5200 g/mol) with TMC and PCL ($M_n$ 80000 g/mol) with TMC.

Figure 13:
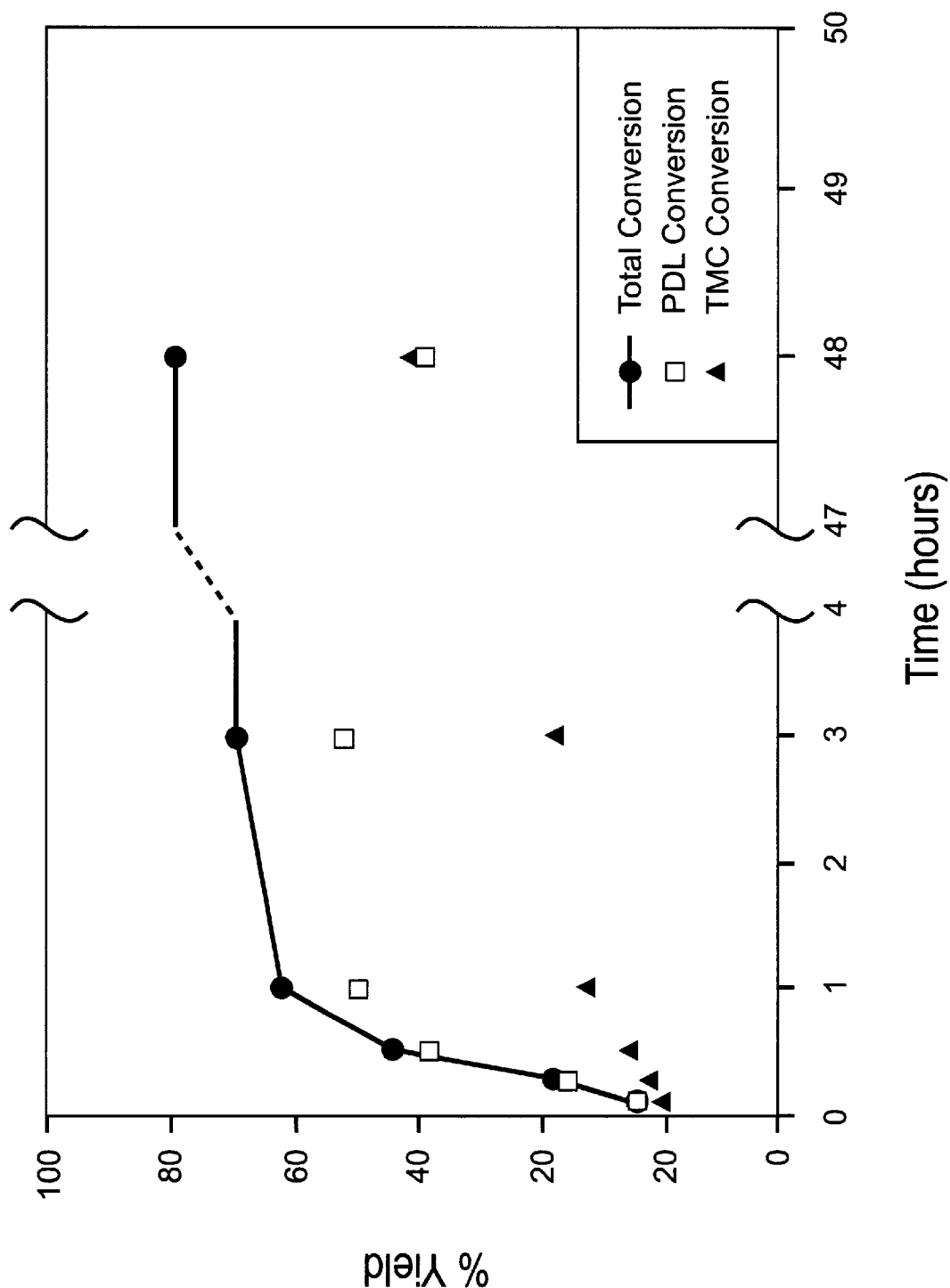
FIG. 13 is the time versus isolated yield of P(PDL-co-TMC) and time versus observed PDL and TMC fraction in Novozyme-435 catalyzed copolymerization of TMC and PDL.

In another embodiment of the invention, poly(ester/carbonate)s were prepared from lipase-catalyzed copolymerizations of PDL and TMC. The co-monomers TMC and PDL (see Table 6 for monomer feed ratios, 1 mmol) were transferred simultaneously under a nitrogen atmosphere into reaction vials that contained the immobilized lipase (Novozym-435) and toluene at 70° C. The ratio of toluene to reactant used was 2:1 (V/W). The above reactants were stirred and the reaction was allowed to continue for times that varied between 5 min and 48 hr. The isolated yield of the copolymer increased with reaction time up to 24 h (compounds 1–6, Table 6) but decreased with further increase in reaction time to 48 hr (compound 7, Table 6). Inspection of FIG. 13 shows that PDL was consumed more rapidly than TMC. The content of TMC in the copolymers increased with reaction time and was equivalent to the content of PDL by 24 hr of reaction (compounds 1–6, Table 6). Similarly, the copolymer molecular weight increased as a function of reaction time until 24 h. An increase in the reaction time from 24 hr to 48 hr resulted in copolymers of reduced molecular weight. Increasing the content of PDL in the monomer feed led to an increase in the product isolated yield and copolymer $M_n$ (compounds 9 and 11, Table 6). Conversely, decrease in the content of TMC in the monomer feed led to a decrease in the product isolated yield and copolymer $M_n$ (compounds 8 and 10, Table 6). By this method of varying the comonomer feed ratio, TMC/PDL copolymers containing a wide range of copolymer compositions were prepared. By using a TMC/PDL feed ratio of 1 to 10, and carrying out the copolymerization at 70° C. in toluene for 24 hr, P(PDL-co-12 mol % TMC) was prepared having $M_n$ 25200 g/mol.

Figure 14:
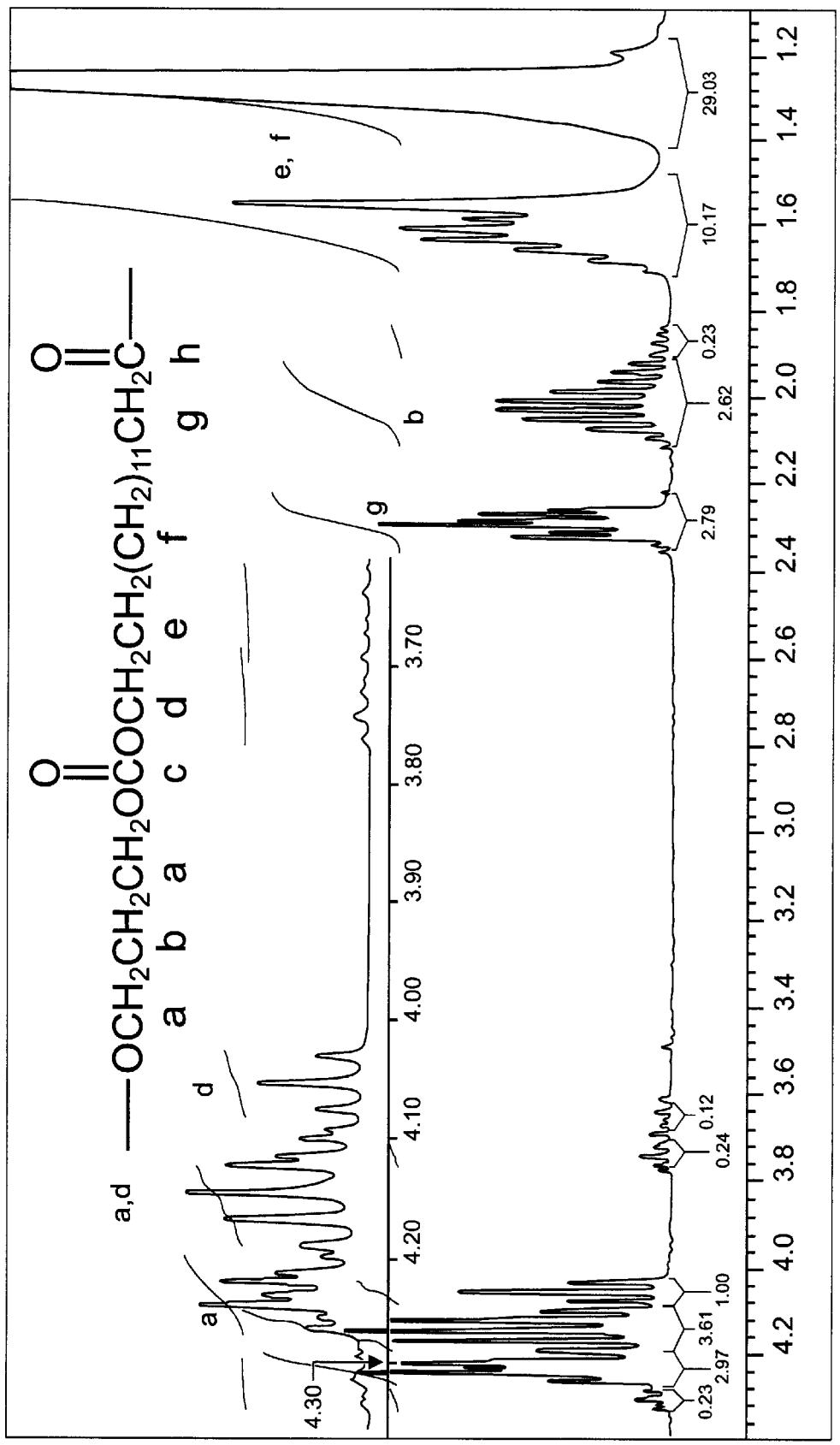
FIG. 14 is the $^1$H-NMR spectrum at 27° C. in CDCl$_3$ of the P(PDL-co-51 mol % TMC) copolymer formed by TMC and PDL (1:1 W/W) after 48 h according to the method of the present invention.
Figure 15:
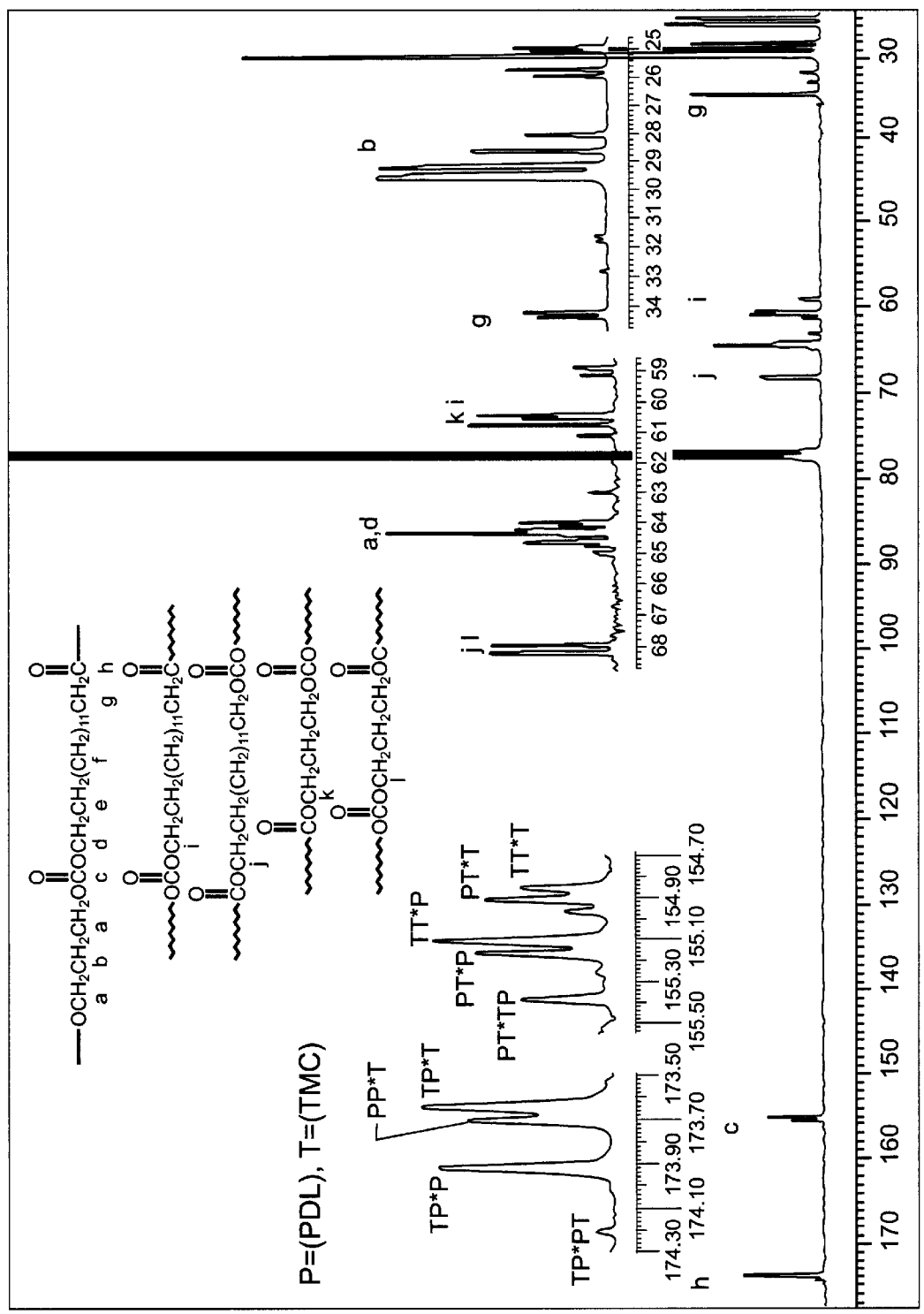
FIG. 15 is the $^{13}$C-NMR spectrum at 27° C. in CDCl$_3$ of the P(PDL-co-51 mol % TMC) copolymer formed by TMC and PDL (1:1 W/W) after 48 h according to the method of the present invention.

Proton $^1$H-NMR and carbon $^{13}$C-NMR spectroscopy were used to analyze the microstructure of the copolymers. A schematic representation of the copolymer structure is shown in Scheme 2. The $^1$H-NMR spectra of poly PDL-co-51 mol % TMC (FIG. 14) was: $^1$H-NMR (CDCl$_3$): δ4.28 (t, HOCH$_2$CH$_2$CH$_2$O), 4.24 (m, 4H, OCH$_2$TMC), 4.10 (m, co-diad, OCH$_2$TMC-PDL/PDL-TMC), 4.04(t, OCH$_2$, PDL), 3.72 (HOCH$_2$CH$_2$CH$_2$O), 3.64 (t, HOCH$_2$(CH$_2$)$_{12}$), 2.28(m, COCH$_2$, PDL), 2.02 (m, COCH$_2$, TMC), 1.90(t, HOCH$_2$CH$_2$CH$_2$O), 1.62 and 1.24 (m, remaining CH$_2$, PDL) ppm. A triplet at δ3.45 was not observed which indicates that no decarboxylation took place during propagation (FIG. 14). The integration ratio of the signals at 2.28 ppm (m, COCH$_2$, PDL) and 2.02 ppm (m, COCH$_2$, TMC) was used to determine repeat unit composition of the copolymers. The observed diad sequences (Table 6) were calculated based on the OCH$_2$ signals (4.28 ppm-4.04 ppm) in the $^1$H-NMR spectra. For example the integrals of signals at 4.24 (m, 4H, OCH$_2$TMC) and 4.04 (t, 2H, OCH$_2$, PDL) were used to calculate the TMC-TMC and PDL-PDL diads, respectively, whereas the integral of the signal at 4.10 (m) was used to calculate TMC-PDL/PDL-TMC diads. The theoretical diad fraction was calculated by assuming a Bernoulli or random statistical copolymerization of two monomers. The diad and triad assignments for the $^{13}$C-NMR spectrum of P(PDL-co-51% TMC) were made by comparison of the signals to those in spectra recorded of the corresponding homopolymers (PPDL, PTMC) and copolymers of different repeat unit composition (25 mol % and 79 mol % TMC). The carbonyl signals of PDL and TMC repeat units for P(PDL-co-51 mol % TMC) were observed in the spectral regions of 173.7–174.3 ppm and 154.9–155.5 ppm, respectively (see FIG. 15). The signals at δ68.4–68.0 and δ60.5–60.9 were assigned to a (j, l) and (k, i), respectively (FIG. 15) and can only appear when a random copolymer is formed. Well resolved diads were observed for PDL COCH$_2$ and all other CH$_2$CH$_2$ signals at δ34.4 (g, PDL-PDL) and 34.2 (g, PDL-TMC), 26.0 (f, PDL-PDL) and 25.7 (f, PDL- TMC), and 25.1 (f, PDL-PDL) and 25.0 (f, PDL-TMC), respectively. $^1$H and $^{13}$C-NMR of P(PDL-co-TMC) suggests that the copolymer formed by Novozym-435 catalyzed polymerization of PDL and TMC from 5 min–1 hr has blocks of PDL with small insertion of TMC ($\mu_{PDL}/\mu_{TMC}$ 15/1-13/3), whereas with increasing time (3 hr–48 hr) the randomness of the copolymer increases ($\mu_{PDL}/\mu_{TMC}$ 6/2-2/2).

The GPC profile of the above copolymer samples were unimodal and the copolymers had polydispersity indexes ranging from 1.32 to 2.69 (see Table 6). The observed and calculated diad fractions for compounds 6–8 were close suggesting that the copolymers tended towards a random distribution of repeat units. Analysis of the DSC thermogram of PTMC shows that it is amorphous (no melting point). Conversely, DSC analysis of PPDL shows a melting transition with a peak at 95° C. The incorporation of less than 15 mol % of PDL in the P(PDL-CO-TMC) block copolymer gave a semicrystalline material. Regulation of the copolymer repeat unit structure allowed for the tailoring of material crystallinity, melting temperature (Table 7), and the degree of crystallinity. Changes in these morphological and thermal properties will be useful in manipulating the physical and biological properties of these copolymers. For example, P(PDL-co-51 mol % TMC) showed two melting transitions with peaks at 56° C. ($\Delta$H 81.09 j/g) and 92° C. ($\Delta$H 2.1 j/g). Lowering of the melting transition of PPDL crystalline phases is a consequence of the incorporation of TMC repeat units along the chain that act is crystalline impurities. The fact that PDL is more reactive than TMC in the copolymerizations and that multiblock copolymers are transformed into random copolymers with increased reaction time indicates that the lipase catalyzes transesterification reactions that allow the main chain to rearrange.

In another embodiment preformed PPDL/PCL was reacted with TMC. PCL($M_n$ 36,000 by NMR) when reacted with TMC in 1:1 molar ratio for 5 hr resulted in insertion of 26 mol % of TMC in the copolymer. The $M_n$ of the copolymer based on NMR was 17500 g/mol. Moreover clear diads were observed for P(PCL-co-26 mol % TMC) and were: PCL-PCL 0.56, TMC-TMC 0.16%, PCL-TMC/TMC-PDL 0.28%. Formation of the PCL-TMC/TMC-PDL can only be explained based on transesterification mechanism. Similarly polyPDL($M_n$ 12000 g/mol) when reacted with TMC in 1:1 molar ratio for 48 hr resulted in P(PDL-co-52.5 mol % TMC) with $M_n$ of 5200 g/mol and PD of 1.57. The observed diads were: PDL-PDL 0.21, TMC-TMC 0.27, PDL-TMC/TMCPDL 0.54. The co-diads explains transesterification reaction between the polyPDL chain and TMC.

1. General Instrumentation

Nuclear Magnetic Resonance (NMR): $^{13}$C-NMR measurements were recorded on a Bruker Instruments, Inc. DPX300 spectrometer at 75.13 MHz with chemical shifts in parts per million (PPM) referenced relative to chloroform as an internal reference at 77.00 ppm. The parameters for the polymer spectra were as follows: 8.0% wt/wt polymer in CDCl$_3$, temperature 310 K, pulse width 60 degrees, 18000 data points, relaxation delay 5.0 seconds, and 14000–18000 transients. For better resolution of diad sequences, a line broadening of 1 Hz was used.

Molecular Weight Measurements: The number average molecular weights ($M_n$) of the polymer samples were determined by gel permeation chromatography (GPC). GPC also allowed calculations of molecular weight distribution ($M_w/M_n$), where $M_w$ is the weight average molecular weight. Studies by GPC were carried out using a Waters, Inc. model 510 pump, a model 410 refractive index detector, and model T-50/T-60 detector of Viscotek Corporation with HR3 styragel column. Trisec GPC software version 3 was used for calculations. Chloroform was used as the eluent at a flow rate of 1.0 mL/min. Sample concentrations of 0.2 w/v and injection volumes of 100 $\mu$L were used. Polystyrene standards with a low polydispersity, obtained from Aldrich Chemical Company, were used to generate a calibration curve.

Thermal Analysis: Differential scanning calorimetry (DSC) was conducted on a DSC 2920 differential scanning calorimeter, commercially available from TA instruments, Inc., equipped with a TA 2000 data station, using between 5.0 mg–10.0 mg of sample, a heating rate of 10° C./minute and a nitrogen purge. Wide angle X-ray scattering (WAXS): PPDL, PCL and PPDL-co-PCL were characterized by wide angle X-ray (WAXS) with Phillips 3100 X-ray generator to investigate the crystallinity. The X-ray source, a XRG 31-generator utilized Cu K$\alpha$ target ($\lambda$k$\alpha$=1.55406A°) with generator settings 40 KV and 20 mA. The 2$\theta$ step for each individual data collection point was set into 0.02° and the analyzer range scanned was 2° to 60°.

2. Synthetic Procedures

All liquid chemical transfers were performed by syringe through rubber septum caps under nitrogen atmosphere. Toluene was dried over calcium hydride, and distilled under nitrogen atmosphere. $\epsilon$-Caprolactone, obtained from Aldrich Chemical Company, Inc., was first dried over calcium hydride and then distilled under reduced pressure in nitrogen atmosphere. Pentadecalactone, obtained from Aldrich Chemical Company, Inc., was used as received. Novozyme-435 was a gift from Novo Nordisk Company.

Synthesis of polycaprolactone (Mn=9200, Pd1.17): Polycaprolactone ($M_n$ 8400 and 9200, Pd 1.11) was synthesized using Aluminum isopropoxide in toluene using the known procedure. See Jacobs et al., Macromolecules, 24, 3029–3034 (1991).

Synthesis of polypentadecalactone: Novozyme (100 mg) and PDL (1 g), which were both dried in a vacuum dessicator (0.1 mmHg, 25° C., 24 hr), were transferred under nitrogen atmosphere into oven dried 10 ml Pyrex culture tubes. The vials were stoppered with a rubber septum and sealed with Teflon tape. Toluene (2.68 g) was subsequently added via syringe under nitrogen into the reaction vial. The vial was then placed into a constant temperature (70° C.) oil bath for 4 hr at 220 rpm. Reaction was terminated by adding excess of chloroform, cooling to room temperature, stirring for 15 min and removal of enzymes by filtration (glass-fritted filter, medium pore porosity). Insoluble was washed several times with hot chloroform. The filtrates were combined, chloroform was rotary evaporated and then precipitated in methanol. The sample was filtered and dried in a vacuum oven at (0.1 mmHg, 50° C.) for 24 hr. The polymers were analyzed for its $M_n$ and Pd.

3. General Procedure for Copolymerization

Novozyme (1/10 wt/wt of the total polymer/monomer), which was dried in a vacuum dessicator (0.1 mmHg, 25° C., 24 hr), was transferred under nitrogen atmosphere into oven dried 10 ml culture tubes containing substrate (monomer/polymer). The vials were stoppered with a rubber septum and sealed with Teflon tape. Toluene, in the range of 1:1 to 1:10 toluene:monomer/polymer, and preferably approximately twice the volume of the total weight of monomer/polymer, was subsequently added via syringe under nitrogen into the reaction vial. The vial was then placed into a constant temperature (70° C.) oil bath at 220 rpm for a predetermined time. Reaction was terminated efficiently by adding excess of cold chloroform and removing the enzymes by filtration (glass-fritted filter, medium pore porosity). Residual enzyme was washed several times with hot chloroform. The filtrates were combined, chloroform was rotary evaporated and then precipitated in methanol. The sample was filtered and dried in a vacuum oven (0.1 mmHg, 50° C., 24 hr). The copolymers prepared by different method or time period had different yield, $M_n$, Pd and repeat unit composition, which is mentioned in Tables 1, 2, 3, and 4.

4. Copolymer Analysis

Example A

The comonomers CL and PDL (molar ratio mentioned in Table 1) were transferred simultaneously under a nitrogen atmosphere into reaction vials that contained the immobilized lipase catalyst (Novozym 435) and toluene at 70° C. The above reactants were stirred and the reaction was allowed to continue for times that varied between 1 min and 24 hr. The isolated yield of the reactions increased for reaction times of 1 min to 45 min and then plateaus. Proton NMR spectra recorded at 300 MHz was unable to distinguish signals such as $(OCH_2)$ that might otherwise have been used to resolve the diads. As shown in FIGS. 1 through 4, in the Carbon or $^{13}C$-NMR spectra, the diad sequences CL-CL, CL-PDL, PDL-PDL and PDL-CL were resolved by analysis of the $OCH_2$, $OCCH_2$ and $OCOCH_2$ carbon. The observed diad fractions in Table 1 were based on the sequence dependent $OCH_2$ $^{13}C$-NMR signals. The theoretical calculation of the diad fractions was carried out based on a series of equations that assume a Bernoulli or random statistical copolymerization of the two monomers. The lipase-catalyzed copolymerization (CL/PDL feed ratio, 1:1 mol/mol) carried out for 1 min and 15 min resulted in polymers that contained 69 mol % and 50+mol % PDL, respectively. The number average molecular weights ($M_n$) and polydispersity index ($M_w/M_n$) of these products were 8400 g/mol and 17800 g/mol, respectively, and 2.5 and 2.4, respectively. The experimental or observed diad fractions for P(CL-co-69 mol % PDL) were as follows: CL-CL 0.11, CL-PDL 0.20, PDL-PDL 0.50, PDL-CL 0.19. Similarly, for P(CL-co-50 mol % PDL) the observed diad fractions were: CL-CL 0.26, CL-PDL 0.24, PDL-PDL 0.28, PDL-CL 0.22. As shown in Table 1, the observed and calculated diad fractions of P(CL-co-PDL) polymers formed using a 1:1 monomer feed ratio were in good agreement for reaction times from 1 min to 6 hr. Thus, when the PDL:CL feed ratio was 1:1, even reaction times as short as 1 min resulted in random polymers. One possible explanation for this behavior is that when a CL or PDL monomer unit is at the growing chain terminus, it will add with a probability approaching equality. Alternatively, such a random array of the repeat units could result from an active transesterification reaction pathway that caused rapid rearrangements of the chain sequence distribution.

Further study of PDL:CL polymerizations with a 1:1 monomer feed ratio revealed that the mole fraction of PDL in the copolyester product was higher at lower reaction times. In other words, as the reaction time was increased from 1 min to 15 min, the fraction of CL in the copolymer increased until CL and PDL in the product were nearly equimolar. Thus, PDL was more rapidly polymerized than CL. As shown in Table 1, the relative reactivity ratios of PDL and CL were calculated based on a series of experiments, carried out for 1 min, using PDL/CL feed ratios of 4:1, 2:1, 1:2, and 1:4. It is noteworthy that for these polymerizations carried out for 1 min, significant differences between experimental and calculated diad sequence values were found. The relative reactivity ratios of the monomers (PDL and CL) calculated using Fineman-Ross plot was found to be 12:1. Therefore, an active transesterification, that causes rapid rearrangement of the chain sequence distribution, best explains the formation of random copolymers so that chains can rapidly re-arrange.

As shown in Table 1, the GPC profile of copolymers having a molar feed ratio of 1:1 PDL/CL, were all unimodal. The $M_n$ of these copolymers increased with an increase in reaction time (1 min to 6 hr, 8410 g/mol to 22,300 g/mol). In addition, the polydispersity values generally decreased as the reaction time was increased from min to 6 hr (2.5 to 1.9). As shown in FIG. 6 and Table 5, comparison of TGA thermograms showed that, relative to PCL, PPDL has a higher thermal stability. Similarly, as shown in FIG. 6 and Table 5, comparison of the TGA thermograms for P(CL-co-48 mol % PDL)(Compound 15, Table 1) and PCL showed that the former has a higher thermally stable. Furthermore, as shown in FIG. 6, the degradation behavior of P(CL-co-48 mol % PDL) resembles that of PPDL. The increase in the stability of this copolymer relative to PCL may be due to the presence of PDL and CL repeat units in close proximity. Indeed, as shown in FIG. 1B, $^{13}C$-NMR analysis of this product showed a statistically random distribution of PDL and CL repeat units. As shown in FIG. 5, the DSC thermogram of this product supported that it indeed had a random repeat unit sequence distribution. While PCL and PPDL have melting points of 54° C. and 95° C., P(CL-co-48 mol % PDL)(Compound 15, Table 1) has a melting point, 78° C., that is intermediate to these values. This suggests that CL in copolymer chain segments disrupts the organization of the PPDL crystalline phase. In other words, the copolymer crystalline phase is that of PPDL. As shown in FIG. 10, the wide angle X-ray diffraction pattern of P(CL-co-48 mol % PDL) )(Compound 15, Table 1) synthesized by reacting ω-PDL with ε-CL for 4 hr in toluene showed highly resolved crystalline reflections superimposed on a low intensity amorphous halo indicating high crystallinity. In addition, the crystalline reflections of P(CL-co-48 mol % PDL) (Compound 15, Table 1) with maximum intensity (100%) at angle 21.62 resembled closely that of PPDL (21.56). In contrast, the maximum intensity diffraction band for homo-PCL is at 21.4. The diffraction bands due to the crystalline PCL phase that were observed for PCL homopolymer at angles (intensity) of 22.18(27%), 30.38(8%), 30.68(8%), 41.44(9%), 48.54(7%) were missing in P(CL-co-0.48 mol % PDL) and PPDL. Moreover, the diffraction band observed for PPDL but not for PCL homopolymer, at an angle of 53.62, was seen for P(CL-co-48 mol % PDL). Hence, the X-ray diffraction results support the conclusion that P(CL-co-48 mol % PDL) is semicrystalline and has the crystalline structure of PPDL.

Example B

PDL was polymerized as above for 3 hr (<90% conversion). Subsequently, CL was added to the reaction vessel (1:1 molar ratio, CL/PDL), and the reaction was maintained at 70° C. with agitation. The reaction was continued for up to 21 hr and the polymer was isolated following the exact procedure as mentioned in exemplification (general procedure to copolymerization). The resulting product, P(CL-co-47 mol % PDL)(Compound 1, Table 1), had an $M_n$ of 18300 g/mol and PD of 1.97. The observed diad fractions for P(CL-co47 mol % PDL) were: CL-CL 0.30, CL-PDL 0.23, PDL-PDL 0.26, PDL-CL 0.21. As shown in Table 1, comparison of the observed and calculated diad fractions shows that this product best approximates random statistics. Thus, transesterification occurred between PPDL and CL so that a random copolymer was formed.

Example C1

Preformed PCL ($M_n$=9200 g/mol, $M_w/M_n$=1.17, 1.5 mmol, 171 mg) and PDL (1.5 mol, 360 mg) were transferred together into reaction vials (10 mL Pyrex culture tubes) that contained Novozym-435 (53 mg), toluene (1.3 g) and were maintained under a nitrogen atmosphere with an external bath temperature of 70° C. The reactions were stirred for 5 min, 15 min, 30 min, 45 min, 2 hr, 4 hr, 6 hr and 7 hr, respectively. The yield of reactions increased from 5 min (66%) to 2 hr (83%) and then plateaus. The observed diad sequence fractions of these products are displayed in Table 2 and were calculated based on the $OCH_2$ signal in $^{13}C$-NMR spectra. P(CL-co-39 mol % PDL) (Compound 1, Table 2, $M_n$ 13200 g/mol, $M_w/M_n$ 2.26), formed after 5 min, was blocky based on $^{13}C$-NMR studies. P(CL-co-56 mol % PDL)(Compound 5, Table 2, $M_n$ 16400 g/mol, $M_w/M_n$ 2.13), formed after 2 hr, also appeared blocky but had a greater extent of CL-PDL and PDL-CL diads. Comparison of the observed and calculated diad values (Bernoullian or random statistics for copolymerization of two monomers) in Table 2 of PDL-co-PCL polymers showed poor agreement. In addition, the deviation between observed and calculated values was greater at shorter reaction times. This shows tendency towards the formation of larger blocks or presence of some preformed homopolymer at shorter time periods (5 min–15 min). As shown in Table 2, it was observed that the average statistical sequence length ($\mu_{CL}$) (calculated based on F. T. Wall. J. Am. Chem. Soc, 66, 2050, 1944) repeat units changes from 20 to 3, whereas $\mu_{PDL}$ changes from 13-3 over the reaction period (5 min to 7 hr).

TGA analysis of P(CL-co-52 mol % PDL) (Compound 6, Table 2, FIG. 6) shows two distinct step transitions corresponding closely to those for PCL and PPDL homopolymers. The DSC thermogram of the copolymer in FIG. 5 shows two melting points at 65° C. and 93° C. The higher melting transition is close to that of PPDL homopolymer (95° C.) while the lower melting transition is slightly above that of PCL homopolymer (51° C.). Thus, the thermal degradation and DSC results are consistent with the $^{13}C$-NMR analysis that describes the product as blocky. This also supports the calculation of average sequence lengths ($\mu_{Cl}$ and $\mu_{PDL}$). The WAXS pattern of P(CL-co-52 mol % PDL) (Compound 8, Table 2) is shown in FIG. 11. The X-ray chromatogram displayed highly resolved crystalline reflections superimposed on a small amorphous halo indicating a high level of crystallinity. In addition, the crystalline reflections of P(CL-co-52 mol % PDL) synthesized by reacting PCL (8400 g/mol) with ω-PDL for 4 hr had the maximum intensity (100%) diffraction band at angle 21.66. This resembled closely that of semicrystalline PPDL homopolymer (21.56) while PCL had a similar diffraction band at 21.41. The diffraction bands assigned to PCL at angles (intensities) of 22.18(27%), 30.68(8%), 41.44(9%), 48.54 (7%) were absent in the X-ray chromatograph for P(CL-co-0.52 mol % PDL) and PPDL. Moreover, the X-ray diffraction band that was observed for PPDL and not for PCL at 53.56 was present for compound 8 in Table 2. Thus, it appears that both melting transitions at 65° C. and 93° C. are due to PPDL crystalline phases. The lower melting transition corresponds to a disrupted PPDL crystalline phase due to the presence of CL units.

The GPC data in FIG. 7 (5 min–45 min) showed interesting results. The appearance of the two peaks at 5 min (major corresponding to PCL), decrease in the PCL intensity with time and then formation of an unimodal peak after 45 min with high molecular weight suggests that all the PCL chain had either PDL grown at the end or transesterified to give copolymer with high molecular weight. Both $\mu_{PDL}$ and $\mu_{CL}$ in the copolymer changed from 18 to 3 over the reaction period (5 min to 7 hr), suggested the transesterifaction pathway. As shown in FIG. 7, the GPC profile of one of the reaction of the copolymers had a $M_n$ of 15000–17000 g/mol, which is considerably increased from its starting PCL, which had a $M_n$ of 9200 g/mol.

Example C2

Preformed PPDL ($M_n$=40200 g/mol, $M_w/M_n$=1.71, 720 mg) and CL (342 µL) were transferred together into reaction vials (10 ml Pyrex culture tubes) that contained Novozym-435 (106 mg) and toluene (2.68 g). The reactions were maintained under a nitrogen atmosphere with an external bath temperature of 70° C. for 3 min, 5 min, 15 min, 30 min, 1 hr, 2 hr and 4 hr respectively. The yield of the reactions increased from 65% to 82% for reaction times of 5 min and 15 min, respectively. Multiblock P(CL-co-55 mol % PDL) ($M_n$ 26500 g/mol, $M_w/M_n$ 2.8) was formed in 15 min and P(CL-co-61 mol % PDL) ($M_n$ 18600 g/mol, $M_w/M_n$ 3.0) in 4 hr. Diad sequence fractions in Table 3 were determined by $^{13}C$-NMR analysis of the copolymer $OCH_2$ signals. The observed diad fractions for P(CL-co-55 mol % PDL) were: CL-CL 0.42, CL-PDL 0.03, PDL-PDL 0.51, PDL-CL 0.03; and for P(CL-co-61 mol % PDL) were: CL-CL 0.33, CL-PDL 0.06, PDL-PDL 0.55, PDL-CL 0.06. The observed and calculated values (Bernoullian or random statistics for copolymerization of two monomers) in Table 3 of PDL-co-PCL copolymers are very different and indicate a tendency toward the formation of long homo-CL ($\mu_{CL}$ 27) and homo-PDL ($\mu_{PDL}$ 82) chain sequences.

Another experiment was performed under similar conditions but with PPDL ($M_n$ 16700 g/mol, PD 2.15), a ratio of PPDL to CL of 2:1 W/V, and reaction times of 15 hr. After a 15 hr reaction time, P(CL-co-34 mol % PDL) was formed with ($M_n$ 19500 g/mol, $M_w/M_n$ 1.78). The observed diad fractions for this copolymer were as follows: CL-CL 0.35, CL-PDL 0.15, PDL-PDL 0.37, PDL-CL 0.13. It was observed (Table 3) that the average statistical sequence length of PCL ($\mu_{CL}$) decreases from 15 to 7 and PPDL ($\mu_{PPDL}$) from 18 to 8 with an increase in reaction time from 15 min to 4 hr. The values of ($\mu_{CL}$) and ($\mu_{PPDL}$) in P(CL-co-34 mol % PDL) were 4 and 3, respectively. The thermal degradation of P(CL-co-34 mol % PDL)(Compound 1, Table 3) has two component transitions that correspond to the respective homopolymers. The DSC thermogram in FIG. 5 shows that compound 1 of Table 3 has melting transitions at 55° C. and 95° C. that likely corresponds to melting of PCL- and PPDL-type crystalline phases. Thus, DSC and TGA results further confirm that this product has a multiblock-type structure. As shown in FIG. 8, all the samples (starting PPDL $M_n$ 40200 g/mol ) showed an unimodal peak with decrease in molecular weight, whereas the profile for (starting PPDL $M_n$ 16700) showed an increase in molecular weight

Example D

Transesterification reactions between PCL samples having molecular weights of 4300, 16700 and 40000 g/mol, and PPDL samples having molecular weights of 9200 and 44000 g/mol were studied. PCL (171 mg) and PPDL (360 mg) were transferred together into reaction vials (10 ml Pyrex culture tubes) that contained Novozym-435 (53 mg). Reactions were carried out in bulk or with the addition of toluene (1.3 g). The reactions were maintained under a nitrogen atmosphere, with an external bath temperature of 70° C., with stirring, for reaction periods from 15 min to 30 hr (see Table 4 for reaction conditions). The yields of products 2–4 (Table 4) from reactions carried out for 15 min to 1 hr in bulk decreased from 73% to 70. Comparison of products 4–5 showed that the use of toluene instead of bulk reaction conditions resulted in decrease in product yields (about 7%). This may be due to the formation of more low molecular weight product, which gets washed during precipitation.

No transesterification was observed when the two polymers were mixed for 1 hr without enzyme (compound 1, Table 4). This conclusion was made as no change in molecular weight and CL-PDL diads were observed. For 15 min with enzyme (compound 2, Table 4,) there was decrease in $M_n$ (3290 g/mol, PD 3.13), but no CL-PDL diads were observed. This may be due to low level of transesterification reactions that may be occurring that are below the detection limit of the analytical methods used. Such reactions, even those that occur only at low level, can have significant impact such as in the formation of diblock interfacial agents. With increase in the reaction time to 30 min and 1 hr (in bulk, starting PPDL 4300, PCL 9200 g/mol, compound 3–4, Table 4), CL-PDL and PDL-CL diads were observed and with increased $M_n$ (8600, 8290 g/mol). With lapse in time the product 3–4 resulted in large to short block copolymer formation ($\mu_{CL}$ 18 to 2, $\mu_{PDL}$ 23 to 2). Reactions in toluene with similar and comparatively high molecular weight preformed polymers were studied for 1 hr (compound 5–9, Table 4). It was observed that the average sequence length ($\mu_{CL}$, $\mu_{PDL}$ in Table 4) increased with increase in polymer molecular weight. The observed diad sequence fractions of products (compounds 1–9, Table 4) were based on $OCH_2$ signals in the $^{13}$C-NMR spectrum. To further investigate the effects of reaction time on randomness of tranesterification reaction, PPDL and PCL having $M_n$ values of 40000 g/mol and 44000, respectively, were studied (compound 9, Table 4). The reaction was carried out in toluene for 30 hr and gave poly(CL-co-50 mol % PDL) ($M_n$ 17200, $M_w/M_n$ 2.17) with diad fractions of CL-CL 0.26, CL-PDL 0.25, PDL-PDL 0.27, PDL-CL 0.23. Increase in reaction time decreases the average sequence length ($\mu_{CL}$, $\mu_{PDL}$) as shown in Table 4.

Table 4 lists the observed and calculated diad fraction values (assuming Bernoullian or random copolymerization statistics) for PPDL-co-PCL polymers from reactions between PCL ($M_n$ 9200 g/mol) and PPDL ($M_n$ 4300 g/mol). Solventless or bulk reactions carried out for 30 min gave a product that deviated from that of a random copolymer. However, increasing the reaction time to 1 hr lead to a product that approached a random statistical distribution (compound 4, Table 4). Similarly, transesterification reactions conducted in between PCL ($M_n$ 44000, PD 1.65 and PPDL ($M_n$ 40000, PD 1.71) resulted in a multiblock copolymer ($M_n$ 64700, PD 1.97) after a 1 hr reaction. However, increasing the reaction time to 30 hr using same condition gave a product ($M_n$ 17200, PD 2.17) that appeared random. Analysis of $\mu_{CL}/\mu_{PDL}$ for compound 3–4 in bulk decreased from 18/23 to 2/2 with increase in the reaction time from 30 min to 1 hr. Reactions in toluene between PCL (44000 g/mol) and PPDL ($M_n$ 40000 g/mol) (1:1 mol/mol, always the same amount of polymer in toluene) gave P(CL-co-50 mol % PDL) that had $\mu_{CL}/\mu_{PDL}$ values after 1 hr and 30 hr of 19/21 and 2/2, respectively. The above suggests that the rate of transesterification between preformed polyesters is molecular weight dependent such that chains of relatively lower molecular weight react more rapidly.

Tranesterification between chains occurs by the activation of a chain carbonyl by the lipase-catalyzed cleavage of an interchain ester group. This reaction leads to the activation of an interchain carbonyl group and the formation of a chain fragment. Subsequently, reaction between the terminal hydroxyl group of another chain with the activated enzyme complex gives productive transesterification reactions. Presently, it is not known whether the effects of molecular weight on these reactions occur throughout the range of possible chain lengths, or these effects are limited to molecular weight changes that are above or below certain critical molecular sizes. Nonetheless, that transesterification between chains of higher molar mass occurs more slowly than for corresponding reactions of lower molecular weight is consistent with the disclosed reaction mechanism. In other words, chains of lower mass will have a higher concentration of hydroxyl terminal chain ends per unit weight. A higher concentration of chain ends would be expected to lead to more rapid reactions with the activated carbonyl of a chain segment. Alternatively, the first step or formation of the activated enzyme ester can occur more rapidly with chain of lower molecular weight.

As shown in FIG. 6 and Table 5, the thermal degradation of P(CL-co-50 mol % PDL) (PCL-PPDL, compound 6, Table 4) at the first step is more close to PCL and the second step is more like PPDL. Appearance of both the PCL and PPDL like TGA patterns suggests that product to be blocky. The DSC thermogram of this sample had two melting points at 63° C. and 95° C. In comparison with the blends (by mixing under similar condition but without enzyme, melting points at 55.40° C. and 94.69° C.) it is much different. Hence the product formed supports multiblock copolymer formation.

Example E

The co-monomers TMC and PDL (See Table 6 for monomer feed ratios, 1 mmol) were transferred simultaneously under a nitrogen atmosphere into reaction vials that contained the immobilized lipase (Novozym-435) and toluene at 70° C. The ratio of toluene to reactant used was 2:1 (V/W). The above reactants were stirred and the reaction was allowed to continue for times that varied between 5 min and 48 hr. The isolated yield of the copolymer increased with reaction time up to 24 hr (compounds 1–6, Table 6) but decreased with further increase in reaction time to 48 hr (compound-7, Table 6). Inspection of FIG. 13 shows that PDL was consumed more rapidly than TMC. The content of TMC in the copolymers increased with reaction time and was equivalent to the content of PDL by 24 hr of reaction (compounds 1–6, Table 6). Similarly, the copolymer molecular weight increased as a function of reaction time until 24 hr. An increase in the reaction time from 24 hr to 48 hr resulted in copolymers of reduced molecular weight. Increasing the content of PDL in the monomer feed led to an increase in the product isolated yield and copolymer $M_n$ (compounds 9 and 11, Table 6). Conversely, decrease in the content of TMC in the monomer feed led to a decrease in the product isolated yield and copolymer $M_n$ (compounds 8 and 10, Table 6). By this method of varying the comonomer feed ratio, TMC/PDL copolymers containing a wide range of copolymer compositions were prepared. By using a TMC/PDL feed ratio of 1 to 10, and carrying out the copolymerization at 70° C. in toluene for 24 hr, P(PDL-co-12 mol % TMC) was prepared having $M_n$ 25200 g/mol.

Proton $^1$H-NMR and carbon $^{13}$C-NMR spectroscopy were used to analyze the microstructure of the copolymers. A schematic representation of the copolymer structure is shown in Scheme 2. The $^1$H-NMR spectra of poly PDL-co-51 mol % TMC (FIG. 14) was: $^1$H-NMR (CDCl$_3$): δ4.28 (t, HOCH$_2$CH$_2$CH$_2$O), 4.24 (m, 4H, OCH$_2$TMC), 4.10 (m, co-diad, OCH$_2$TMC-PDL/PDL-TMC), 4.04(t, OCH$_2$, PDL), 3.72 (HOCH$_2$CH$_2$CH$_2$O), 3.64 (t, HOCH$_2$(CH$_2$)$_{12}$), 2.28(m, COCH$_2$, PDL), 2.02 (m, COCH$_2$, TMC), 1.90(t, HOCH$_2$CH$_2$CH$_2$O), 1.62 and 1.24 (m, remaining CH$_2$, PDL) ppm. A triplet at δ3.45 was not observed which indicates that no decarboxylation took place during propagation (FIG. 14). The integration ratio of the signals at 2.28 ppm (m, COCH$_2$, PDL) and 2.02 ppm (m, COCH$_2$, TMC) was used to determine repeat unit composition of the copolymers. The observed diad sequences (Table 6) were calculated based on the OCH$_2$ signals (4.28 ppm-4.04 ppm) in the $^1$H-NMR spectra. For example, the integrals of signals at 4.24 (m, 4H, OCH$_2$TMC) and 4.04 (t, 2H, OCH$_2$, PDL) were used to calculate the TMC-TMC and PDL-PDL diads, respectively, whereas the integral of the signal at 4.10 (m) was used to calculate TMC-PDL/PDL-TMC diads.

The theoretical diad fraction was calculated by assuming a Bernoulli or random statistical copolymerization of two monomers. The diad and triad assignments for the $^{13}$C-NMR spectrum of P(PDL-co-51% TMC) were made by comparison of the signals to those in spectra recorded of the corresponding homopolymers (PPDL, PTMC) and copolymers of different repeat unit composition (25 mol % and 79 mol % TMC). The carbonyl signals of PDL and TMC repeat units for P(PDL-co-51 mol % TMC) were observed in the spectral regions of 173.7–174.3 ppm and 154.9 ppm–155.5 ppm, respectively (see FIG. 15). The signals at δ68.4–68.0 and 60.5–60.9 were assigned to (j, l) and (k, i), respectively (FIG. 15) and can only appear when a random copolymer is formed. Well resolved diads were observed for PDL COCH$_2$ and all other CH$_2$CH$_2$ signals at δ34.4(g, PDL-PDL) and 34.2 (g, PDL-TMC), 26.0 (f, PDL-PDL) and 25.7 (f, PDL-TMC), and 25.1 (f, PDL-PDL) and 25.0 (f, PDL-TMC), respectively. $^1$H and $^{13}$C-NMR of P(PDL-co-TMC) suggests that the copolymer formed by Novozym-435 catalyzed polymerization of PDL and TMC from 5 min–1 hr has blocks of PDL with small insertion of TMC($\mu_{PDL}/\mu_{TMC}$ 15/1-13/3), whereas with increasing time (3 hr–48 hr) the randomness of the copolymer increases ($\mu_{PDL}/\mu_{TMC}$ 6/2-2/2).

The GPC profile of the above copolymer samples were unimodal and the copolymers had polydispersity indexes ranging from 1.32 to 2.69 (see Table 6). The observed and calculated diad fractions for compounds 6–8 were close suggesting that the copolymers tended towards a random distribution of repeat units. Analysis of the DSC thermogram of PTMC shows that it is amorphous (no melting point). Conversely, DSC analysis of PPDL shows a melting transition with a peak at 95° C. The incorporation of less than 15 mol % of PDL in the P(PDL-CO-TMC) block copolymer gave a semicrystalline material. Regulation of the copolymer repeat unit structure allowed for the tailoring of material crystallinity, melting temperature (Table 7), and the degree of crystallinity. Changes in these morphological and thermal properties will be useful in manipulating the physical and biological properties of these copolymers. For example, P(PDL-co-51 mol % TMC) showed two melting transitions with peaks at 56° C. (ΔH 81.09 J/g) and 92° C. (ΔH 2.1 J/g). Lowering of the melting transition of PPDL crystalline phases is a consequence of the incorporation of TMC repeat units along the chain that act is crystalline impurities. The fact that PDL is more reactive than TMC in the copolymerizations and that multiblock copolymers are transformed into random copolymers with increased reaction time indicates that the lipase catalyzes transesterification reactions that allow the main chain to rearrange.

Example F

In another embodiment, preformed PPDL/PCL was reacted with TMC. PCL($M_n$ 36,000 by NMR) when reacted with TMC in 1:1 molar ratio for 5 hr resulted in insertion of 26 mol % of TMC in the copolymer. The $M_n$ of the copolymer based on NMR was 17500 g/mol. Moreover clear diads were observed for P(PCL-co-26 mol % TMC) and were as follows: PCL-PCL 0.56, TMC-TMC 0.16%, PCL-TMC/TMC-PDL 0.28%. Formation of the PCL-TMC/TMC-PDL can only be explained based on transesterification mechanism. Similarly, polyPDL $M_n$ 12000 g/mol when reacted with TMC in 1:1 molar ratio for 48 hr resulted in P(PDL-co-52.5 mol % TMC) with $M_n$ of 5200 g/mol and PD of 1.57. The observed diads were: PDL-PDL 0.21, TMC-TMC 0.27, PDL-TMC/TMCPDL 0.54. The co-diads explains transesterification reaction between the polyPDL chain and TMC.

Different methods have been adopted towards the synthesis of polycaprolactone-co-polypentadecalactone. Reaction of two different monomers, monomer with a polymer and one polymer with another polymer have been studied by Novozyme in toluene. This method results in copolymer formation with different repeat unit sequence composition. The potential of one of this process is very exciting as two polymers can be transesterified by Novozyme in toluene/bulk to yield copolymer which other wise is difficult to copolymerize from its monomer. This technology will find commercial value in polymer blends as many commercially useful blends are based on polyesters.

The immobilized preparation of *Candida antartica* lipase B (Novozym-435, Novo Nordisk) was studied for its ability to catalyze transesterification reactions between: i) the monomers ε-caprolactone (CL), ω-pentadecalactone (PDL), and a propagating copolymer chain; ii) CL/poly(PDL) (PPDL); iii) PDL/PCL; and iv) PCL/PPDL. The reactions were normally conducted in toluene that functioned as a good solvent for both the monomer and polymer substrates. In addition, bulk or solventless copolymerizations were also investigated. By using various ratios of monomers and/or polymers, lipase-catalyzed transesterification provided a mild method to regulate the microstructure of poly(ω-hydroxycaproate-co-ω-hydroxypentadecanoate) P(CL-co-PDL). This strategy, when applied to other monomer and polymer systems, is broadly useful. Furthermore, surprising accelerations of monomer-to-polymer conversions were achieved by properly engineering the co-reactant composition. In summary, a versatile route to novel copolymer structures was found that provides important advantages relative to the alternative chemical routes.

The above detailed description of the preferred embodiments, including the example methods, and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

TABLE 1

Novozym-435 catalyzed polypentadecalactone-co-polycaprolactone formation

| Product # | PDL:CL moles | Time | % Yield | DI AD CL-CL Obs(cal) | CL-PDL Obs(cal) | Sequence PDL-CL Obs(cal) | PDL-PDL Obs(cal) | $M_n$ g/mol | $M_w/M_n$ | PCL/PPDL Observed Mol % |
|---|---|---|---|---|---|---|---|---|---|---|
| 1 | 1:1 | 24* Hr | 87 | 0.30(0.28) | 0.23(0.25) | 0.21(0.25) | 0.26(0.22) | 18300 | 1.97 | 53/47 |
| 2 | 4:1 | 1 min | 22 | 0.11(0.02) | 0.03(0.13) | 0.11(0.13) | 0.75(0.72) | 9180 | 2.80 | 15/85 |
| 3 | 2:1 | 1 min | 20 | 0.15(0.04) | 0.05(0.17) | 0.15(0.17) | 0.64(0.62) | 9400 | 2.59 | 21/79 |
| 4 | 1:1 | 1 min | 19 | 0.11(0.10) | 0.20(0.21) | 0.19(0.21) | 0.50(0.47) | 8410 | 2.50 | 31/69 |
| 5 | 1:2 | 1 min | 09 | 0.16(0.12) | 0.18(0.23) | 0.18(0.23) | 0.45(0.42) | 8460 | 2.26 | 35/65 |
| 6 | 1:4 | 1 min | 09 | 0.55(0.30) | 0.24(0.25) | 0.20(0.25) | 0.25(0.21) | 11200 | 2.11 | 55/45 |
| 7 | 1:1 | 2 min | 23 | 0.14(0.14) | 0.23(0.23) | 0.20(0.23) | 0.42(0.40) | 12600 | 2.19 | 37/63 |
| 8 | 1:1 | 5 min | 34 | 0.19(0.16) | 0.21(0.24) | 0.23(0.24) | 0.37(0.36) | 14600 | 2.37 | 40/60 |
| 9 | 1:1 | 10 min | 44 | 0.25(0.21) | 0.24(0.25) | 0.21(0.25) | 0.31(0.29) | 16800 | 2.41 | 48/52 |
| 10 | 1:1 | 15 min | 53 | 0.26(0.25) | 0.24(0.25) | 0.22(0.25) | 0.28(0.25) | 17800 | 2.38 | 50/50 |
| 11 | 1:1 | 30 min | 72 | 0.26(0.24) | 0.23(0.25) | 0.25(0.25) | 0.26(0.26) | 19800 | 2.46 | 49/51 |
| 12 | 1:1 | 45 min | 88 | 0.28(0.25) | 0.22(0.25) | 0.26(0.25) | 0.24(0.25) | 19300 | 2.28 | 50/50 |
| 13 | 1:1 | 1 hr | 88 | 0.29(0.25) | 0.20(0.25) | 0.23(0.25) | 0.27(0.25) | 19600 | 2.37 | 49/51 |
| 14 | 1:1 | 2 hr | 89 | 0.25(0.25) | 0.25(0.25) | 0.23(0.25) | 0.27(0.25) | 18000 | 2.08 | 50/50 |
| 15 | 1:1 | 4 hr | 90 | 0.23(0.26) | 0.30(0.25) | 0.24(0.25) | 0.24(0.24) | 21200 | 1.87 | 52/48 |
| 16 | 1:1 | 6 hr | 93 | 0.26(0.26) | 0.26(0.25) | 0.24(0.25) | 0.24(0.24) | 22300 | 1.97 | 52/48 |

Copolymerization reaction carried out at 70° C. using Novozyme-435 as catalyst (monomers:enzyme ratio 10:1 W/W) in toluene (2:1 toluene:monomers) V/W).
*caprolactone added after three hours of polymerization of PDL

TABLE 2

Novozym-435 catalyzed polypentadecalactone-co-polycaprolactone formation

| Product # | Comp Moles | Time Hrs | % Yield | DI AD CL-CL Obs(cal) | CL-PDL Obs(cal) | Sequence PDL-CL Obs(cal) | PDL-PDL Obs(cal) | $M_n$ g/mol | $M_w/M_n$ | *$\mu_{CL}$/ *$\mu_{PDL}$ | PCL/ PDL |
|---|---|---|---|---|---|---|---|---|---|---|---|
| 1 | 1:1 | 5 min | 66 | 0.56(0.34) | 0.03(0.24) | 0.03(0.24) | 0.38(0.17) | 13200 | 2.26 | 20/13 | 61/39 |
| 2 | 1:1 | 15 min | 82 | 0.43(0.26) | 0.07(0.25) | 0.07(0.24) | 0.43(0.25) | 14800 | 2.57 | 7/7 | 51/49 |
| 3 | 1:1 | 30 min | 83 | 0.33(0.20) | 0.12(0.25) | 0.11(0.25) | 0.44(0.30) | 17700 | 2.4 | 4/5 | 45/55 |
| 4 | 1:1 | 45 min | 82 | 0.31(0.19) | 0.13(0.25) | 0.13(0.25) | 0.43(0.31) | 19800 | 1.99 | 3/4 | 44/56 |
| 5 | 1:1 | 2 Hr | 83 | 0.31(0.19) | 0.13(0.25) | 0.14(0.25) | 0.42(0.31) | 16400 | 2.13 | 3/4 | 44/56 |
| 6 | 1:1 | 4 Hr | 76 | 0.33(0.23) | 0.15(0.25) | 0.14(0.25) | 0.38(0.27) | 18300 | 1.97 | 3/4 | 48/52 |
| 7 | 1:1 | 6 Hr | 77 | 0.30(0.23) | 0.18(0.25) | 0.16(0.25) | 0.36(0.27) | 16300 | 2.04 | 3/3 | 48/52 |
| 8 | 1:1 | 7 Hr | 84 | 0.29(0.22) | 0.17(0.25) | 0.18(0.25) | 0.26(0.28) | 17100 | 1.97 | 3/3 | 47/53 |

Copolymerization reaction carried out at 70° C. using Novozyme-435 as catalyst (monomer/polymer:enzyme ratio 10:1 W/W) in toluene (2:1 toluene:monomer/polymer) V/W).
*$\mu_{CL}$ = f$_{CL-PDL}$ + f$_{CL-CL}$/f$_{CL-PDL}$,
*$\mu_{PDL}$ = f$_{PDL-CL}$ + f$_{PDL-PDL}$/f$_{PDL-CL}$

TABLE 3

| Product # | Comp Moles | Time Hrs | % Yield | DI AD CL-CL Obs(cal) | CL-PDL Obs(cal) | Sequence PDL-CL Obs(cal) | PDL-PDL Obs(cal) | $M_n$ g/mol | $M_w/M_n$ | .$\mu_{CL}$/ .$\mu_{PDL}$ | PCL/ PDL |
|---|---|---|---|---|---|---|---|---|---|---|---|
| 1 | 1:2# | 15 hr | 59 | 0.35(0.43) | 0.15(0.22) | 0.13(0.22) | 0.37(0.12) | 19500 | 1.78 | 4/3 | 66/34 |
| 2 | 1:1 | 3 min | 68 | 0.18 | — | — | 0.82 | 29200 | 2.87 | | 18/82 |
| 3 | 1:1 | 5 min | 66 | 0.27 | — | — | 0.73 | 17600 | 3.38 | | 27/73 |
| 4 | 1:1 | 15 min | 82 | 0.42(0.20) | 0.03(0.25) | 0.03(0.25) | 0.51(0.30) | 26500 | 2.8 | 15/18 | 45/55 |
| 5 | 1:1 | 30 min | 69 | 0.31(0.11) | 0.03(0.22) | 0.03(0.22) | 0.64(0.45) | 12700 | 4.09 | 11/22 | 33/67 |
| 6 | 1:1 | 1 Hr | 87 | 0.52(0.27) | 0.04(0.25) | 0.03(0.25) | 0.45(0.23) | 17700 | 3.08 | 13/16 | 52/48 |
| 7 | 1:1 | 2 Hr | 85 | 0.40(0.19) | 0.04(0.25) | 0.07(0.25) | 0.50(0.32) | 23200 | 2.62 | 11/8 | 44/56 |
| 8 | 1:1 | 4 Hr | 69 | 0.33(0.37) | 0.06(0.24) | 0.06(0.24) | 0.55(0.37) | 18600 | 3.0 | 7/10 | 39/61 |

Copolymerization reaction carried out at 70° C. using Novozyme-435 as catalyst (monomer/polymer:enzyme ratio 10:1 W/W) in toluene (2:1 toluene:monomer/polymer) V/W).
$M_n$ 16700, Pd 2.15
.$\mu_{CL}$ = f$_{CL-PDL}$ + f$_{CL-CL}$/f$_{CL-PDL}$,
.$\mu_{PDL}$ = f$_{PDL-CL}$ + f$_{PDL-PDL}$/f$_{PDL-CL}$

TABLE 4

| Product # | Sol. | Mn PCL/ PPDL × 10³ g/mol | Time | % Yield | Diad CL-CL Obs(cal) | CL-PDL Obs(cal) | Sequence PDL-CL Obs(cal) | PDL-PDL Obs(cal) | Mn g/mol | .μ$_{CL}$/.μ$_{PDL}$ | Mw/Mn | PCL/ PDL |
|---|---|---|---|---|---|---|---|---|---|---|---|---|
| 1 | No | 9.2/4.3 | 1 h* | 66 | 0.56 | — | — | 0.44 | 7030 | | 2.59 | 56/44 |
| 2 | No | 9.2/4.3 | 15 min | 73 | 0.56 | — | — | 0.44 | 3290 | | 3.13 | 56/44 |
| 3 | No | 9.2/4.3 | 30 min | 70 | 0.52(0.30) | 0.03(0.25) | 0.02(0.25) | 0.44(0.20) | 8630 | 18/23 | 2.12 | 55/45 |
| 4 | No | 9.2/4.3 | 1 h | 70 | 0.25(0.25) | 0.25(0.25) | 0.27(0.25) | 0.23(0.25) | 8290 | 02/02 | 1.99 | 50/50 |
| 5 | Tol | 9.2/4.3 | 1 h | 63 | 0.27(0.22) | 0.20(0.25) | 0.21(0.25) | 0.32(0.27) | 8700 | 03/03 | 1.92 | 50/50 |
| 6 | Tol | 9.2/16.7 | 16 h | 86 | 0.35(0.26) | 0.15(0.25) | 0.12(0.25) | 0.38(0.24) | 19700 | 03/04 | 1.82 | 50/50 |
| 7 | Tol | 9.2/40 | 1 h | 75 | 0.29(0.13) | 0.06(0.33) | 0.06(0.23) | 0.58(0.41) | 37200 | 06/11 | 2.69 | 36/64 |
| 8 | Tol | 44/40 | 1 h | 86 | 0.36(0.14) | 0.02(0.24) | 0.03(0.24) | 0.62(0.38) | 64700 | 19/21 | 1.97 | 38/62 |
| 9 | Tol | 44/40 | 30 h | 83 | 0.26(0.25) | 0.25(0.25) | 0.23(0.25) | 0.27(0.25) | 17200 | 02/02 | 2.17 | 50/50 |

Copolymerization reaction carried out at 70° C. using Novozyme-435 as catalyst (polymer:enzyme ratio 10:1 W/W).
*Without enzyme, ratio of toluene:polymer 2:1
.μ$_{CL}$ = f$_{CL-PDL}$ + f$_{CL-CL}$/f$_{CL-PDL}$,
.μ$_{PDL}$ = f$_{PDL-CL}$ + f$_{PDL-PDL}$/f$_{PDL-CL}$

TABLE 5

Thermal Decomposition Temperatures of PCL-PDL Copolymers (Determined by TGA)

| Sample | Product # | Polymer composition | T$_1$ | T$_1$' | T of 10% weight loss |
|---|---|---|---|---|---|
| PCL | — | — | 249 | 270 | 305 |
| PCL-PDL | 6, Table 2 | P(CL-co-52 mol % PDL) | 245 | 255 | 318 |
| PDL-CL | 15, Table 1 | P(CL-co-48 mol % PDL) | 255 | 266 | 369 |
| PPDL-CI | 1, Table 3 | P(CL-co-34 mol % PDL) | 248 | 252 | 313 |
| PCL-PPDL | 6, Table 4 | P(CL-co-50 mol % PDL) | 229 | 272 | 348 |
| PPDL | — | — | 362 | 369 | 389 |
| PPDL/PCL (blend) | | 1:1 moles | 231 | 277 | 379 |

PCL (M$_n$ 9200 g/mol),
PPDL (M$_n$ 16700 g/mol),
Blend (1:1 molar mixture of PCL and PPDL melted at 100° C.),
T$_1$ = Starting decomposition temperature,
T$_1$' = Decomposition temperature.

DSC data of the copolymers

| Sample | Product # | Polymer composition | T$_1$ °C. | T$_2$ °C. |
|---|---|---|---|---|
| PCL | — | — | 53.81 | — |
| PCL-PDL | 6, Table 2 | P(CL-co-52 mol % PDL) | 65.44 | 92.89 |
| PDL-CL | 15, Table 1 | P(CL-co-48 mol % PDL) | 77.78 | — |
| PPDL-CI | 1, Table 3 | P(CL-co-34 mol % PDL) | 55.16 | 95.28 |
| PCL-PPDL | 6, Table 4 | P(CL-co-50 mol % PDL) | 62.51 | 94.59 |
| PPDL | — | — | 94.69 | — |
| PPDL/PCL (blend) | | 1:1 moles | 55.4 | 94.69 |

T$_1$ and T$_2$ are melting temperature

TABLE 6

| Prod # | Feed Ratio (PDL:TMC) | Time | Polymer composition (PDL:TMC) | Diad Sequence PDL-PDL Obs (cal) | PDL-TMC Obs(cal) | TMC-PDL Obs (cal) | TMC-TMC Obs (cal) | Yield (%) | μ$_{PDL}$/ μ$_{TMC}$ | Mn g/mol | PD |
|---|---|---|---|---|---|---|---|---|---|---|---|
| 1 | 1:1 | 5 min | 92/08 | .85(.85) | .06(.07) | .06(.07) | .03(.01) | 5 | 15/1 | 5390 | 2.69 |
| 2 | 1:1 | 15 min | 88/12 | .84(.77) | .06(.11) | .06(.11) | .04(.02) | 18 | 15/2 | 5570 | 2. |
| 3 | 1:1 | 30 min | 87/13 | .81(.75) | .07(.11) | .07(.11) | .05(.17) | 44 | 12/2 | 7100 | 2.31 |
| 4 | 1:1 | 1 h | 80/20 | .84(.64) | .06(.16) | .06(.16) | .04(.04) | 62 | 13/3 | 7310 | 2.39 |
| 5 | 1:1 | 3 h | 75/25 | .61(.56) | .13(.19) | .13(.19) | .13(.06) | 69 | 06/02 | 13000 | 2.07 |
| 6 | 1:1 | 24 h | 50/50 | .25(.25) | .23(.25) | .23(.25) | .29(.25) | 83 | 02/02 | 18800 | 1.65 |
| 7 | 1:1 | 48 h | 49/51 | .18(.24) | .27(.25) | .27(.25) | .28(.26) | 79 | 02/02 | 12100 | 2.00 |
| 8 | 1:4 | 24 h | 21/79 | .04(.04) | .18(.17) | .19(.17) | .59(.62) | 42 | 01/04 | 10600 | 2.37 |
| 9 | 4:1 | 24 h | 75/25 | .49(.56) | .22(.09) | .21(.09) | .08(.06) | 85 | 03/01 | 24200 | 1.96 |

TABLE 6-continued

| Prod # | Feed Ratio (PDL:TMC) | Time | Polymer composition (PDL:TMC) | Diad Sequence PDL-PDL Obs (cal) | PDL-TMC Obs(cal) | TMC-PDL Obs (cal) | TMC-TMC Obs (cal) | Yield (%) | $\mu_{PDL}/\mu_{TMC}$ | Mn g/mol | PD |
|---|---|---|---|---|---|---|---|---|---|---|---|
| 10 | 1:10 | 24 h | 28/72 | .15(.08) | .14(.20) | .15(.20) | .56(.52) | 28 | 02/05 | 7320 | 1.32 |
| 11 | 10:1 | 24 h | 88/12 | .70(.77) | .13(.10) | .13(.10) | .03(.01) | 92 | 07/01 | 25200 | 1.85 |

$\mu_{TMC} = f_{TMC-PDL} + f_{TMC-TMC}/f_{TMC-PDL}$,
$\mu_{PDL} = f_{PDL-TMC} + f_{PDL-PDL}/f_{PDL-TMC}$

TABLE 7

DSC data Copolymerization of TMC and PDL by Novozyme-435 in toluene.

| Product # | Feed Ratio (PDL:TMC) | Time (hrs) | Observed Ratio (PDL:TMC) | Tm (° C.) (TMC, PDL) | Tg TMC | Tg PDL | ΔH TMC (J/g) | ΔH PDL (J/g) | Yield (%) | Mn g/mol | PD |
|---|---|---|---|---|---|---|---|---|---|---|---|
| 1 | 1:1 | 3 | (75/25) | 90.64 | −28.95 | — | 138.8 | — | 69 | 13000 | 2.07 |
| 2 | 1:1 | 15 | (55/45) | 90.60 | −26.49 | — | 87.55 | — | 88 | 24500 | 1.68 |
| 3 | 1:1 | 24 | (50/50) | 90.92 | −27.72 | — | 92.58 | — | 83 | 18800 | 1.65 |
| 4 | 1:1 | 48 | (49/51) | 59.58, 92.89* | −31.78 | — | 91.31 | 2.445 | 79 | 12100 | 2.00 |
| 5 | 1:4 | 24 | (21/79) | 27.49, 92.34* | −23.92 | — | 34.04 | 1.163 | 42 | 10600 | 2.37 |
| 6 | 4:1 | 24 | (75/25) | 80.79 | −21.71 | — | 126.5 | — | 85 | 24200 | 1.96 |
| 7 | 1:10 | 24 | (28/72) | 85.66 | −27.37 | — | 35.38 | — | 28 | 7320 | 1.32 |
| 8 | 1:1** | 20 | (16/84) | 82.50 | −14.85 | — | 34.63 | — | 40 | 26400 | 2.59 |
| 9 | 1:1 | — | Blend | 96.39 | −12.74 | — | 69.19 | — | — | — | — |
| 10 | 0:1 | 24 | — | — | −11.00 | — | — | — | — | 55000 | 1.89 |

**reaction catalyzed by MAO and the copolymer is blocky.

What is claimed is:

1. A method to regulate copolymer structure using lipase catalyzed transesterification reactions, comprising the steps of:
   a. selecting a first reactant from the group consisting of polymers and monomers;
   b. selecting a second reactant also from the group consisting of polymers and monomers; and
   c. combining the first reactant, the second reactant, and a lipase in a reaction vessel and allowing the ensuing transesterification reaction to proceed resulting in a copolymer,
      wherein the ensuing transesterification reaction occurs between and not at the terminal ends of at least one of the first reactant and the second reactant.

2. The method characterized in claim 1, wherein at least one of the first reactant and the second reactant is selected from the group consisting of polymers with chain structures.

3. The method characterized in claim 2, wherein the polymers with chain structures comprise functional groups at a chain end.

4. The method characterized in claim 2, wherein the polymers with chain structures comprise functional groups within repeat units of chains.

5. The method characterized in claim 2, wherein the polymers with chain structures comprise functional groups as part of pendant groups.

6. The method characterized in claim 2, wherein the polymers with chain structures comprise functional groups as chain branches that can participate in the lipase-catalyzed formation of ester, amide or carbonate linkages.

7. The method characterized in claim 1, wherein the first reactant, the second reactant and the lipase are maintained under a nitrogen atmosphere.

8. The method characterized in claim 1, further comprising the addition of a solvent in the reactant vessel.

9. The method characterized in claim 8, wherein the solvent is selected from the group consisting of toluene, diisopropyl ether, THF, dioxane, 1,2-dichloroethane, chloroform, cyclohexane, benzene, butyl ether and isooctane.

10. The method characterized in claim 9, wherein the lipase and the toluene are at a temperature of between 25° C. and 105° C.

11. The method characterized in claim 10, wherein the lipase and the toluene are at a temperature of between 60° C. and 80° C.

12. The method characterized in claim 11, wherein the lipase is selected from the group consisting of an immobilized form of *Candida antartica* lipase B, immobilized lipase PS from *Pseudomonas fluorescens*, immobilized lipase PC from *Pseudomonas cepacia*, lipase PA from *Pseudomonas aeruginosa*, lipase from Porcine Pancreas (PPL), *Candida cylindreacea* (CCL), *Candida rugosa* (CR), *Penicillium roqueforti* (PR), *Aspergillus niger* (AK), and Lypozyme IM from *Mucor miehei*.

13. The method characterized in claim 1, wherein the transesterification reaction is allowed to continue for between 1 min and 24 hr.

14. The method characterized in claim 1, wherein at least one of the first reactant and the second reactant is a monomer is selected from the group consisting of lactones and cyclic carbonates.

15. The method characterized in claim 14, wherein the monomer is selected from the group consisting of trimethylene carbonate, ε-caprolactone, β-butyrolactone, β-propiolactone, δ-butyrolactone, benzylmalanolactone, dioxanone, dodecalactone, ω-pentadecalactone, undecalactone, α-methyl valerolactone, valerolactone, and 8-octanolide.

16. The method characterized in claim 1, wherein the first reactant and the second reactant are supplied in a weight ratio of between 1:1 and 1:20 to each other.

17. The method characterized in claim 1, wherein the lipase is present in the amount of between 0.0001% and 20% by weight, and between 0.0001% and 2.0% by weight of the lipase is active.

18. The method characterized in claim 8, wherein the solvent is present in an amount up to 90% of the reaction content.

19. The method characterized in claim 18, wherein the solvent is present in an amount of approximately twice the volume of the monomer.

20. The method characterized in claim 2, wherein the polymers with chain structures are selected from the group consisting of polyesters, polycarbonates, polyethers, and combinations thereof.

21. A method to tailor polymer structure using lipase catalyzed transesterification reactions, comprising the steps of:
   a. selecting a first reactant from the group consisting of trimethylene carbonate, ε-caprolactone, β-butyrolactone, β-propiolactone, δ-butyrolactone, benzylmalanolactone, dioxanone, dodecalactone, ω-pentadecalactone, undecalactone, α-methyl valerolactone, valerolactone, 8-octanolide, and polymers with chain structures;
   b. selecting a second reactant from the group consisting of trimethylene carbonate, ε-caprolactone, β-butyrolactone, β-propiolactone, δ-butyrolactone, benzylmalanolactone, dioxanone, dodecalactone, ω-pentadecalactone, undecalactone, α-methyl valerolactone, valerolactone, 8-octanolide, and polymers with chain structures; and
   c. combining the first reactant, the second reactant, a lipase, and a solvent in a reaction vessel and allowing the ensuing transesterification reaction to proceed by chain reaction resulting in a copolymer,
      wherein the ensuing transesterification reaction occurs between the terminal ends of at least one of the first reactant and the second reactant.

22. The method characterized in claim 21, wherein the ensuing transesterification reaction occurs at an interchain functional group.

23. The method characterized in claim 22, wherein the polymers with chain structures are selected from the group consisting of polyesters, polycarbonates, polyethers, and combinations thereof.

24. The method characterized in claim 23, wherein the solvent is selected from the group consisting of toluene, diisopropyl ether, THF, dioxane, 1,2-dichloroethane, chloroform, cyclohexane, benzene, butyl ether and isooctane.

25. The method characterized in claim 24, wherein the lipase is selected from the group consisting of an immobilized form of *Candida antartica* lipase B, immobilized lipase PS from *Pseudomonas fluorescens*, immobilized lipase PC from *Pseudomonas cepacia*, lipase PA from *Pseudomonas aeruginosa*, lipase from Porcine Pancreas (PPL), *Candida cylindreacea* (CCL), *Candida rugosa* (CR), *Penicillium roqueforti* (PR), *Aspergillus niger* (AK), and Lypozyme IM from *Mucor miehei*.

26. The method characterized in claim 25, wherein the first reactant and the second reactant are supplied in a weight ratio of between 1:1 and 1:20 to each other.

27. The method characterized in claim 26, wherein the lipase is present in the amount of between 0.0001% and 20% by weight, and between 0.0001% and 2.0% by weight of the lipase is active.

28. A method to tailor polymer structure using lipase catalyzed transesterification reactions, comprising the steps of:
   a. selecting a first reactant from the group consisting of lactones, cyclic carbonates, and combinations thereof;
   b. selecting a second reactant from the group consisting of lactones, cyclic carbonates, and combinations thereof;
   c. selecting a lipase from the group consisting of an immobilized form of *Candida antartica* lipase B, immobilized lipase PS from *Pseudomonas fluorescens*, immobilized lipase PC from *Pseudomonas oepacia*, lipase PA from *Pseudomonas aeruginosa*, lipase from Porcine Pancreas (PPL), *Candida cylindreacea* (CCL), *Candida rugosa* (CR), *Penicillium roqueforti* (PR), *Aspergillus niger* (AK), and Lypozyme IM from *Mucor miehei*; and
   d. combining the first reactant, the second reactant, the lipase, and a solvent in a reaction vessel and allowing the ensuing transesterification reaction to proceed by chain reaction resulting in a copolymer,
      wherein the transesterification reaction occurs by the activation of a chain carbonyl by the lipase-catalyzed cleavage of an interchain functional group between the terminal ends of at least one of the first reactant and the second reactant.

29. The method characterized in claim 28, wherein the lactone is selected from the group consisting of ε-caprolactone, β-butyrolactone, βpropiolactone, δ-butyrolactone, benzylmalanolactone, dioxanone, dodecalactone, ω-pentadecalactone, undecalactone, α-methyl valerolactone, valerolactone, and 8-octanolide.

30. The method characterized in claim 28, wherein the cyclic carbonate is trimethylene carbonate.

31. The method characterized in claim 30, wherein the polymers with chain structures are selected from the group consisting of polyesters, polycarbonates, polyethers, and combinations thereof.

32. The method characterized in claim 31, wherein the solvent is selected from the group consisting of toluene, diisopropyl ether, THF, dioxane, 1,2-dichloroethane, chloroform, cyclohexane, benzene, butyl ether and isooctane.

33. The method characterized in claim 32, wherein the first reactant and the second reactant are supplied in a weight ratio of between 1:1 and 1:20 to each other.

34. The method characterized in claim 33, wherein the lipase is present in the amount of between 0.0001% and 20% by weight, and between 0.0001% and 2.0% by weight of the lipase is active.

35. A method for tailoring polymers using lipase comprising:
   a. selecting a first reactant that is a preformed polymer;
   b. selecting a second reactant selected from the group consisting of polymers and monomers;
   c. combining the first reactant, the second reactant, a lipase, and a solvent in a reaction vessel and allowing the ensuing transesterification reaction to occur between and not at the terminal ends of the first reactant and proceed by chain reaction resulting in a copolymer comprising the first reactant and the second reactant.

36. The method characterized in claim 35, whereby the lipase activates an atom between the terminal ends of the chain of the first reactant and the activated atom reacts the terminal end of the second reactant.

37. The method characterized in claim 36, wherein the second reactant also is a preformed polymer.

38. The method characterized in claim 37, wherein the ensuing transesterification reaction occurs at an interchain functional group.

39. The method characterized in claim 38, wherein the preformed polymer has a chain structure selected from the group consisting of polyesters, polycarbonates, polyethers, and combinations thereof.

40. The method characterized in claim 39, wherein the solvent is selected from the group consisting of toluene, diisopropyl ether, THF, dioxane, 1,2-dichloroethane, chloroform, cyclohexane, benzene, butyl ether and isooctane.

41. The method characterized in claim 40, wherein the lipase is selected from the group consisting of an immobilized form of *Candida antarctica* lipase B, immobilized lipase PS from *Pseudomonas fluorescens*, immobilized lipase PC from *Pseudomonas cepacia*, lipase PA from *Pseudomonas aeruginosa*, lipase from Porcine Pancreas (PPL), *Candida cylindreacea* (CCL), *Candida rugosa* (CR), *Penicillium roqueforti* (PR), *Aspergillus niger* (AK), and Lypozyme IM from *Mucor miehei*.

42. The method characterized in claim 41, wherein the first reactant and the second reactant are supplied in a weight ratio of between 1:1 and 1:20 to each other.

43. The method characterized in claim 42, wherein the lipase is present in the amount of between 0.0001% and 20% by weight, and between 0.0001% and 2.0% by weight of the lipase is active.

44. A method for tailoring polymers using lipase comprising:
   a. selecting a first reactant that is a preformed polymer having a chain structure selected from the group consisting of polyesters, polycarbonates, polyethers, and combinations thereof;
   b. selecting a second reactant that also is a preformed polymer having a chain structure selected from the group consisting of polyesters, polycarbonates, polyethers, and combinations thereof;
   c. combining the first reactant, the second reactant, a lipase, and a solvent in a reaction vessel and allowing the ensuing transesterification reaction to occur between and not at the terminal ends of the first reactant and proceed by chain reaction resulting in a copolymer comprising the first reactant and the second reactant, wherein the lipase activates an atom between the terminal ends of the chain of the first reactant and the activated atom reacts the terminal end of the second reactant and the ensuing transesterification reaction occurs at an interchain functional group.

45. The method characterized in claim 44, wherein the first reactant and the second reactant are supplied in a weight ratio of between 1:1 and 1:20 to each other.

46. The method characterized in claim 45, wherein the solvent is selected from the group consisting of toluene, diisopropyl ether, THF, dioxane, 1,2-dichloroethane, chloroform, cyclohexane, benzene, butyl ether and isooctane.

47. The method characterized in claim 46, wherein the lipase is selected from the group consisting of an immobilized form of *Candida antarctica* lipase B, immobilized lipase PS from *Pseudomonas fluorescens*, immobilized lipase PC from *Pseudomonas cepacia*, lipase PA from *Pseudomonas aeruginosa*, lipase from Porcine Pancreas (PPL), *Candida cylindreacea* (CCL), *Candida rugosa* (CR), *Penicillium roqueforti* (PR), *Aspergillus niger* (AK), and Lypozyme IM from *Mucor miehei*.

48. The method characterized in claim 47, wherein the lipase is present in the amount of between 0.0001% and 20% by weight, and between 0.0001% and 2.0% by weight of the lipase is active.

* * * * *